US011919589B2

(12) United States Patent
Kuschmeader et al.

(10) Patent No.: US 11,919,589 B2
(45) Date of Patent: *Mar. 5, 2024

(54) BICYCLE RACK WITH ACTUATED ARM

(71) Applicant: Kuat Innovations LLC, Springfield, MO (US)

(72) Inventors: Luke Kuschmeader, Springfield, MO (US); Aaron Houston, Springfield, MO (US); Austin Harrill, Springfield, MO (US); Jordan Bowles, Springfield, MO (US); Jonathan Graif, Springfield, MO (US)

(73) Assignee: Kuat Innovations LLC, Springfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,813

(22) Filed: Nov. 2, 2021

(65) Prior Publication Data

US 2022/0055703 A1     Feb. 24, 2022

Related U.S. Application Data

(63) Continuation of application No. 16/686,008, filed on Nov. 15, 2019, now Pat. No. 11,208,167.
(Continued)

(51) Int. Cl.
*B62H 3/08*     (2006.01)
*B60R 9/06*     (2006.01)
(Continued)

(52) U.S. Cl.
CPC ................ *B62H 3/08* (2013.01); *B60R 9/06* (2013.01); *B60R 9/10* (2013.01); *B62H 3/12* (2013.01)

(58) Field of Classification Search
CPC ... B62H 3/08; B62H 3/12; B62H 3/04; B62H 3/06; B62H 3/00; B60R 9/06; B60R 9/10;
(Continued)

(56) References Cited

U.S. PATENT DOCUMENTS 3,366,256 A    1/1968   Meredith et al.
3,529,737 A    9/1970   Daugherty
(Continued)

FOREIGN PATENT DOCUMENTS

CA      2219573 A1    4/1998
EP      1245448 A2    10/2002
WO    2021097316 A1    5/2021

OTHER PUBLICATIONS

"Corrected Notice of Allowability Received for U.S. Appl. No. 16/686,008, dated Nov. 19, 2021".
(Continued)

*Primary Examiner* — Corey N Skurdal
(74) *Attorney, Agent, or Firm* — Kutak Rock LLP; James H Jeffries

(57) ABSTRACT

A bicycle rack is described with an actuated arm that pivots to an open position in response to user activation of the actuator. The actuator is attached to the rack and the arm and exerts a force on the arm by extension to pivot the actuated arm to the open position. The actuator extends only when a release mechanism has been actuated by a user, but a user may pivot the actuated arm back to a closed position, or a position securing a bicycle, without actuating the release. The actuated arm will then be retained at a position selected by the user until the release is actuated by the user again.

20 Claims, 25 Drawing Sheets

Related U.S. Application Data

(60) Provisional application No. 62/767,994, filed on Nov. 15, 2018.

(51) Int. Cl.
*B60R 9/10* (2006.01)
*B62H 3/12* (2006.01)

(58) Field of Classification Search
CPC ... B60R 9/04; B60R 9/00; B60R 11/00; Y10S 224/924; Y10T 403/589
See application file for complete search history.

(56) References Cited

U.S. PATENT DOCUMENTS

| | | |
|---|---|---|
| 3,720,333 A | 3/1973 | Vaughn |
| 3,822,898 A | 7/1974 | Brownlie |
| 3,843,001 A | 10/1974 | Willis |
| 3,921,842 A | 11/1975 | Campbell |
| 4,171,077 A | 10/1979 | Richard, Jr. |
| 4,524,893 A | 6/1985 | Cole |
| 4,629,104 A | 12/1986 | Jacquet |
| 4,646,952 A | 3/1987 | Timmers |
| 5,157,591 A | 10/1992 | Chudzik |
| 5,692,659 A | 12/1997 | Reeves |
| 5,833,074 A | 11/1998 | Phillips |
| 6,039,228 A | 3/2000 | Stein et al. |
| 6,283,310 B1 | 9/2001 | Dean et al. |
| 6,322,238 B1 | 11/2001 | Barr |
| 6,352,359 B1 | 3/2002 | Shie et al. |
| 6,460,743 B2 | 10/2002 | Edgerly et al. |
| 6,868,998 B2 | 3/2005 | Dean |
| 6,868,986 B1 | 11/2005 | Lloyd et al. |
| 7,857,179 B1 | 12/2010 | Allen et al. |
| 8,511,655 B2 | 8/2013 | Wu |
| 8,950,592 B1 | 2/2015 | Greenblatt et al. |
| 9,039,263 B2 | 5/2015 | Hofmann et al. |
| 9,610,993 B1 | 4/2017 | Ho |
| 9,956,922 B2 | 5/2018 | Phillips |
| 10,005,329 B2 | 6/2018 | Phillips |
| 10,059,276 B2 | 8/2018 | Phillips |
| 10,011,237 B1 | 9/2018 | Phillips |
| 10,065,568 B2 | 9/2018 | Phillips |
| 10,071,695 B2 | 9/2018 | Phillips |
| 10,086,769 B1 | 10/2018 | Phillips |
| 10,099,525 B1 | 10/2018 | Phillips |
| 10,150,424 B1 | 12/2018 | Phillips |
| 10,464,499 B2 | 11/2019 | Arvidsson et al. |
| 10,688,939 B2 | 6/2020 | Settelmayer |
| 11,208,167 B2 | 12/2021 | Kuschmeader et al. |
| 11,242,101 B2 | 2/2022 | Kuschmeader et al. |
| 2002/0125279 A1 | 9/2002 | Edgerly et al. |
| 2003/0175308 A1 | 9/2003 | Roberts et al. |
| 2004/0070168 A1 | 4/2004 | McKinnon |
| 2006/0157523 A1 | 7/2006 | Girod et al. |
| 2007/0069534 A1 | 3/2007 | Morrill et al. |
| 2007/0164065 A1 | 7/2007 | Davis |
| 2007/0164068 A1 | 7/2007 | Godshaw et al. |
| 2007/0165065 A1 | 7/2007 | Davis |
| 2008/0206030 A1 | 8/2008 | Reuille et al. |
| 2011/0220594 A1 | 9/2011 | Chuang |
| 2013/0224978 A1 | 8/2013 | Arakelian |
| 2016/0068110 A1 | 3/2016 | Prescott et al. |
| 2016/0068111 A1 | 3/2016 | Walker |
| 2017/0190369 A1 | 7/2017 | Rayl |
| 2018/0001830 A1 | 1/2018 | Olaison et al. |
| 2018/0072237 A1 | 3/2018 | Kuschmeader et al. |
| 2018/0178703 A1 | 6/2018 | Keck |
| 2018/0222398 A1 | 9/2018 | Philips |
| 2020/0070734 A1 | 3/2020 | Settelmayer |
| 2020/0156724 A1 | 5/2020 | Kuschmeader et al. |
| 2021/0147021 A1 | 5/2021 | Kuschmeader et al. |
| 2021/0147022 A1 | 5/2021 | Kuschmeader et al. |
| 2021/0147023 A1 | 5/2021 | Harrill et al. |
| 2022/0185196 A1 | 6/2022 | Kuschmeader et al. |

OTHER PUBLICATIONS

"Final Office Action Received for U.S. Appl. No. 16/840,365, dated Sep. 2, 2021".

"International Preliminary Report on Patentability for International Application PCT/US2020/060548, Report dated May 17, 2022, dated May 27, 2022."

"Joe McKinney Muncy, Concise Description of Relevance, Oct. 13, 2021, 12 pages."

"Non-Final Office Action Received for U.S. Appl. No. 16/840,365, dated Dec. 31, 2020."

"Non-Final Office Action Received for U.S. Appl. No. 16/849,399, dated Jun. 17, 2021."

"Non-Final Office Action Received for U.S. Appl. No. 17/158,549, dated Aug. 26, 2022."

"Notice of Allowance received for U.S. Appl. No. 16/840,365, dated Dec. 20, 2021"

"Screen capture from Kuat Innovations, LLC, "Piston E-bike Ramp", Web screenshots, https://shop.kuat.com/Piston-E-Bike-Ramp, retrieved on Aug. 22, 2022".

Non-Final Office Action Received for U.S. Appl. No. 16/686,008, dated Sep. 30, 2021.

Inno Advanced Car Racks / Car Mate USA, "INH305 Tire Hold Hitch Instruction Manual", Web page/pdf file http://www.innoracks.com/support/instructions/INH305_EN.pdf, 8 pages, published on Sep. 2, 2013, retrieved from Internet Archive Wayback Machine on Nov. 5, 2021.

Screen captures from YouTube video clip, Doug Mitchell, "1UP USA Quik-Rack One Bike Add On", Web video screenshots, uploaded Sep. 24, 2011, https://www.youtube.com/watch?v=9wCp5vjjz7I&t=1s, 7 pages, retrieved on Nov. 5, 2021.

Saris Cycling Group, Inc., "Freedom Superclamp", Web page/pdf file, 9 pages, published on Aug. 12, 2014, retrieved from Internet Archive Wayback Machine on Nov. 5, 2021.

Thule, T2 918XTR-2 Bike Add-on for (2" Hitch), Web page/pdf file, 8 pages, published on Jul. 30, 2013, retrieved from Internet Archive Wayback Machine on Nov. 5, 2021.

International Search Report and Written Opinion Received for PCT Application No. PCT/US2020/060548, Search completed on Jan. 12, 2021, dated Feb. 5, 2021.

Screen capture from YouTube video clip entitled "INNO Tyre Hold bike carrier INA389—How to fit," 1 Page, uploaded on Apr. 26, 2021; Retrieved from Internet: https://www.youtube.com/watch?v=04-Id8zwiCQ.

Screen capture from YouTube video clip entitled "Inno INH305 Tire Hold Hitch Platform Bike Rack Demonstration," 1 Page, uploaded on Apr. 26, 2021; Retrieved from Internet: https://www.youtube.com/watch?v=eMb5XbSPQtU.

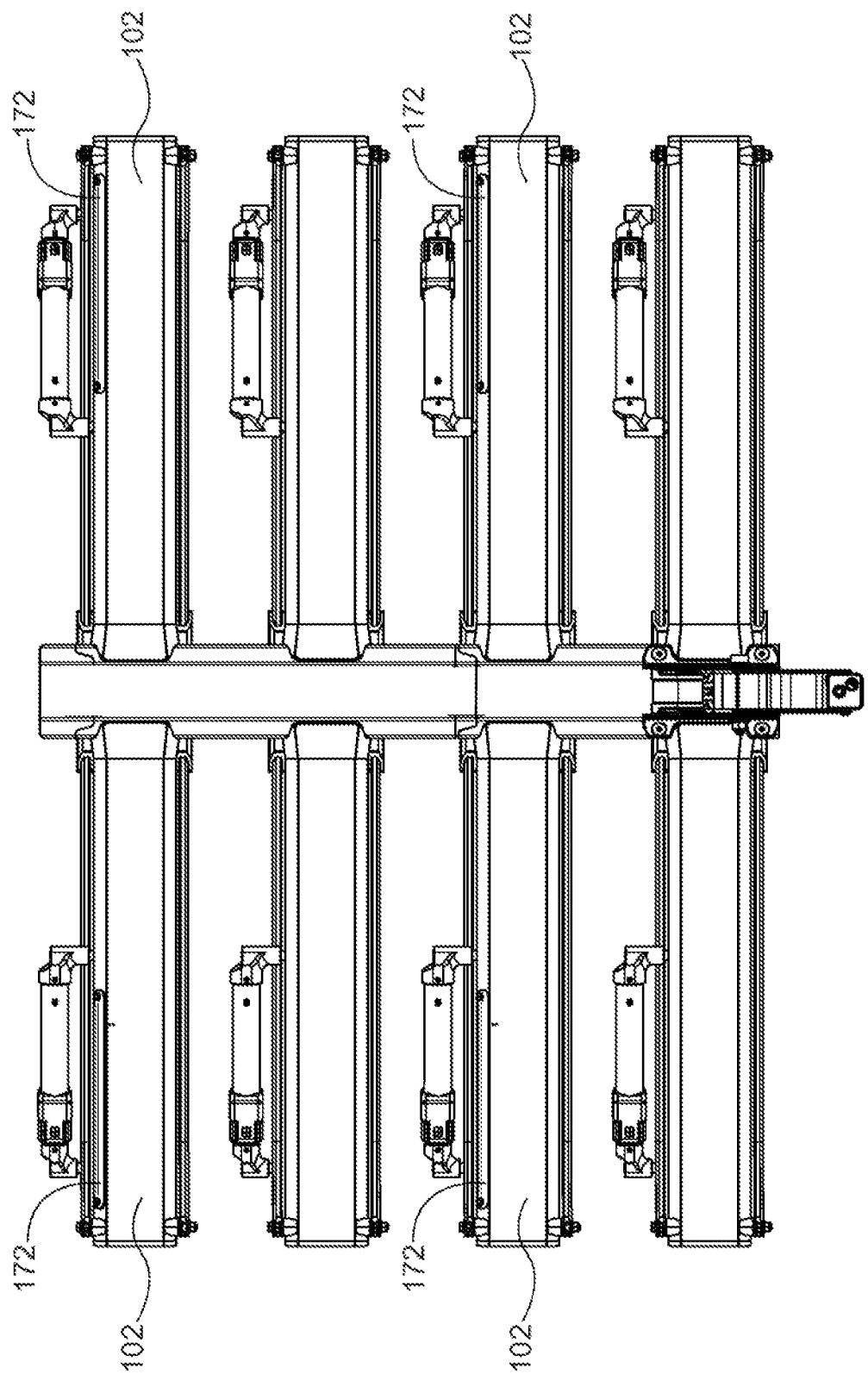

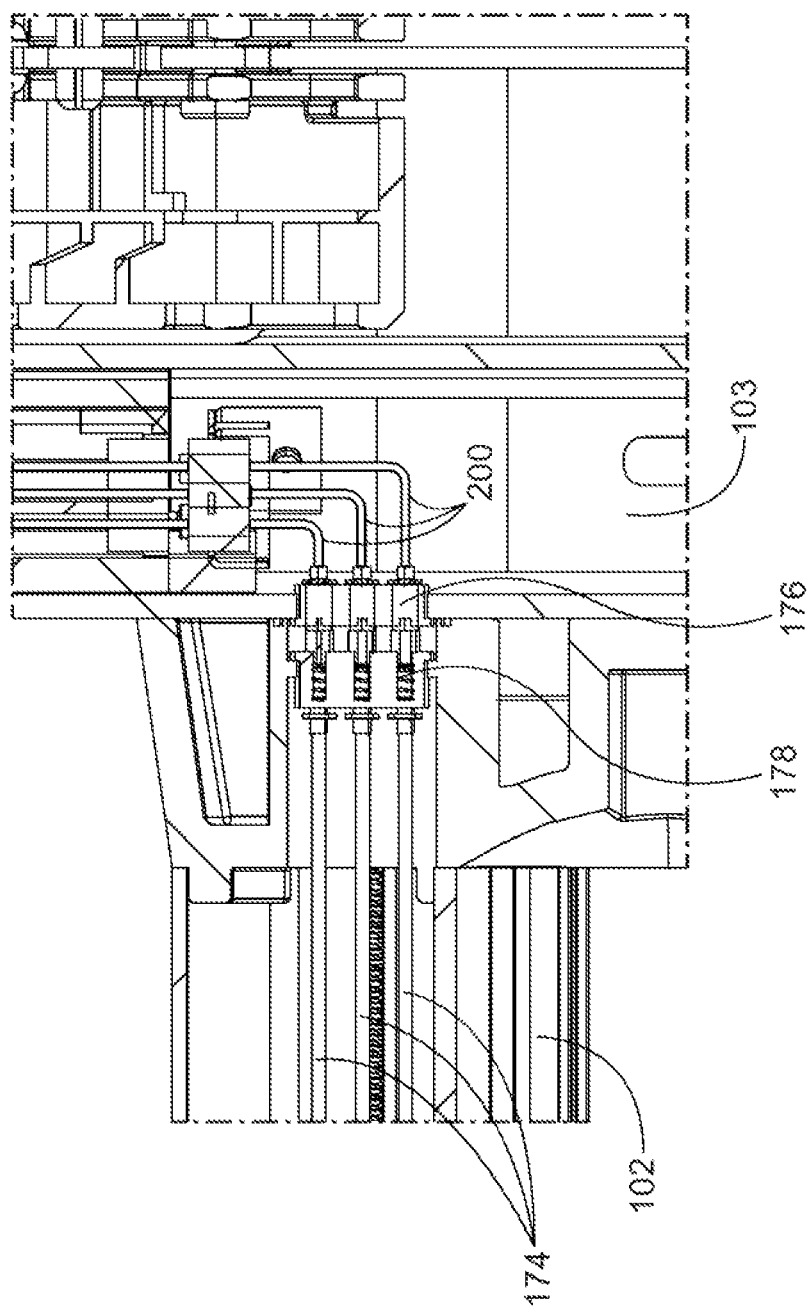

BICYCLE RACK WITH ACTUATED ARM

CROSS-REFERENCE TO RELATED APPLICATIONS

This application claims the benefit of U.S. Provisional Patent Application Ser. No. 62/767,994 filed Nov. 15, 2018, is a continuation of and claims the benefit of U.S. patent application Ser. No. 16/686,008 filed Nov. 15, 2019, and the disclosures of which are incorporated herein by reference.

BACKGROUND

Field of the Invention

This disclosure is in the field of equipment racks for carrying equipment, such as bicycles, on a vehicle. The disclosure relates to devices and systems for actuating various components of the equipment racks to make them easier to use and more secure.

Description of the Related Art

Some bicycle racks utilize one or more pivoting arms to secure the frame or the tires of a bicycle onto a platform provided on the frame of the bicycle rack of the type shown in FIG. 1. The arm may be provided with an attachment fixture that is hook or hoop shaped to contact the surface of the frame or tire of the bicycle and apply a force on it to retain the bicycle on the rack. In other embodiments the arms may also be provided with other types of attachment fixtures to secure the frame or other tires of the bicycle to the rack. An example of a bicycle rack of this type is depicted in U.S. Patent Publication No. 2018/0072237.

In some of these devices the arm is pivotally attached at a first point along the length of the arm to the frame of the bicycle rack. A tire chock component of the hoop or hook may be at or near the other end of the arm and may be adjustably attached so that the tire chock may be moved along a portion of the length of the arm to adjust the hoop or hook to the size of the bicycle tires or frame. In some cases the length of the arm may be adjustable to move the tire chock component to the desired position.

In many of these devices the user pivots the arm to an open position to allow a bicycle to be placed on the rack. The user then places the bicycle on the rack, and the arm is then pivoted back in the other direction until the tire chock on the arm is brought into contact with the frame or tire of the bicycle. Depending on the design of the specific device, this contact may be accomplished partially through pivoting of the arm and partially through adjustment of the tire chock position. In various such devices, the arm or the tire chock is then secured or locked in place in a retention position to hold the bicycle on the rack.

In some versions of these types of bicycle racks, the arm may fold or pivot to a stowed position that is substantially flat against or adjacent to the frame of the bicycle rack when not in use to secure a bicycle. Among other advantages, this closed position reduces wind resistance and noise and reduces the chance of damage to the arm.

In current bicycle racks that utilize one or more pivoting arms as described above, a variety of adjustment and retention mechanisms are utilized to secure an arm in a desired position, whether it be in the closed position, the open position, or the retention position against the tire or frame of a bicycle. The retention mechanism must allow a user to secure the arm in whatever position is desired by the user of the rack when in use on a bicycle or stowed and allow the arm to pivot from one position to another when desired by the user.

In bicycle racks of this type, the arm often requires a user to utilize two hands to reposition the arm from one position to another position while releasing the retention mechanism. In some versions of the rack, the user may have to hold the retention mechanism in a disengaged configuration while pivoting the arm to the new position. In other versions of these types of racks, it may be necessary for a user to hold the arm in the desired position with one hand while using the other hand to engage or disengage the retention mechanism. In some versions of the rack, it may be practically necessary for a user to use both hands to pivot the arm or adjust the tire chock.

In the prior versions of bicycle racks of this type, both hands of the user are simultaneously required to manipulate and adjust the arm and the rack, making it difficult to (i) hold a bike while opening the rack, (ii) place the bike onto the rack when the arm is in the open position, (iii) hold the bike while adjusting the arm into the retention position, or (iv) engage or disengage the retention mechanism. As a result, existing racks of this type may require a user to either utilize awkward positions and other body parts such as forearms, elbows, knees, or hips to hold the bicycle or move the arm or require the user to have help from an additional person.

The bicycle rack described herein provides an improvement over currently used bicycle racks because it provides an actuated arm that may be fully adjusted to a bicycle with a single hand, freeing the other hand to hold the bicycle in the desired position. In varying versions of the improved rack, the actuated arm may automatically move from a closed position to an open position upon use of an actuator and may be capable of moving from an open position to an engaged retention position with the use of a single hand of a user. Furthermore, the actuated arm may also be actuated to pivot to an over-rotated position to allow for usage of a ramp with the bicycle rack. The actuated arm may also be provided with an improved tire chock that may be adjusted on the actuated arm with the use of a single hand.

SUMMARY OF THE INVENTION

In various embodiments, the invention comprises a bicycle rack with a platform for supporting the tire of a bicycle. An arm is pivotally attached to the platform to secure and retain the tire and the bicycle on the rack. The arm pivots to an open position so that the bicycle tire may be placed on the platform of the rack. Then the arm may be pivoted by a user to a closed position to engage the upper surface of the tire or a part of the bicycle frame to hold the bicycle tire in place on the platform.

An actuator is provided to automatically pivot the arm from a closed position to an open position upon the user actuating a release mechanism. The release mechanism may comprise a lever, button, or other similar means of actuation. The actuator allows the user to pivot the arm back towards the closed position to a retention position, but then retains the actuated arm in that position by means of a linear ratchet or other similar devices and methods of the invention as described in relation to the embodiments depicted herein. The retention of the actuated arm against the tire or frame of the bicycle holds the bicycle on the rack.

BRIEF DESCRIPTION OF THE DRAWINGS

FIG. 14A is an end view of an embodiment of the assembly with an integrated lighting system in a stowed configuration.

FIG. 14C is a cross-sectional view of an embodiment of the assembly with an integrated lighting system.

DETAILED DESCRIPTION

The improved bicycle rack described herein provides an actuated arm to allow for easier loading and unloading of a bicycle onto the rack. The rack is provided with one or more pivotal arms that can be adjusted to secure the bicycle on the rack. The arms in the improved bicycle rack are provided with actuators that assist the user in opening, closing, and adjusting the arms to secure the bicycles on the rack. The specific embodiment of a bicycle rack shown in the figures is not limiting of the scope of the invention but is an example of how the invention may be used in a bicycle rack.

Figure 1:
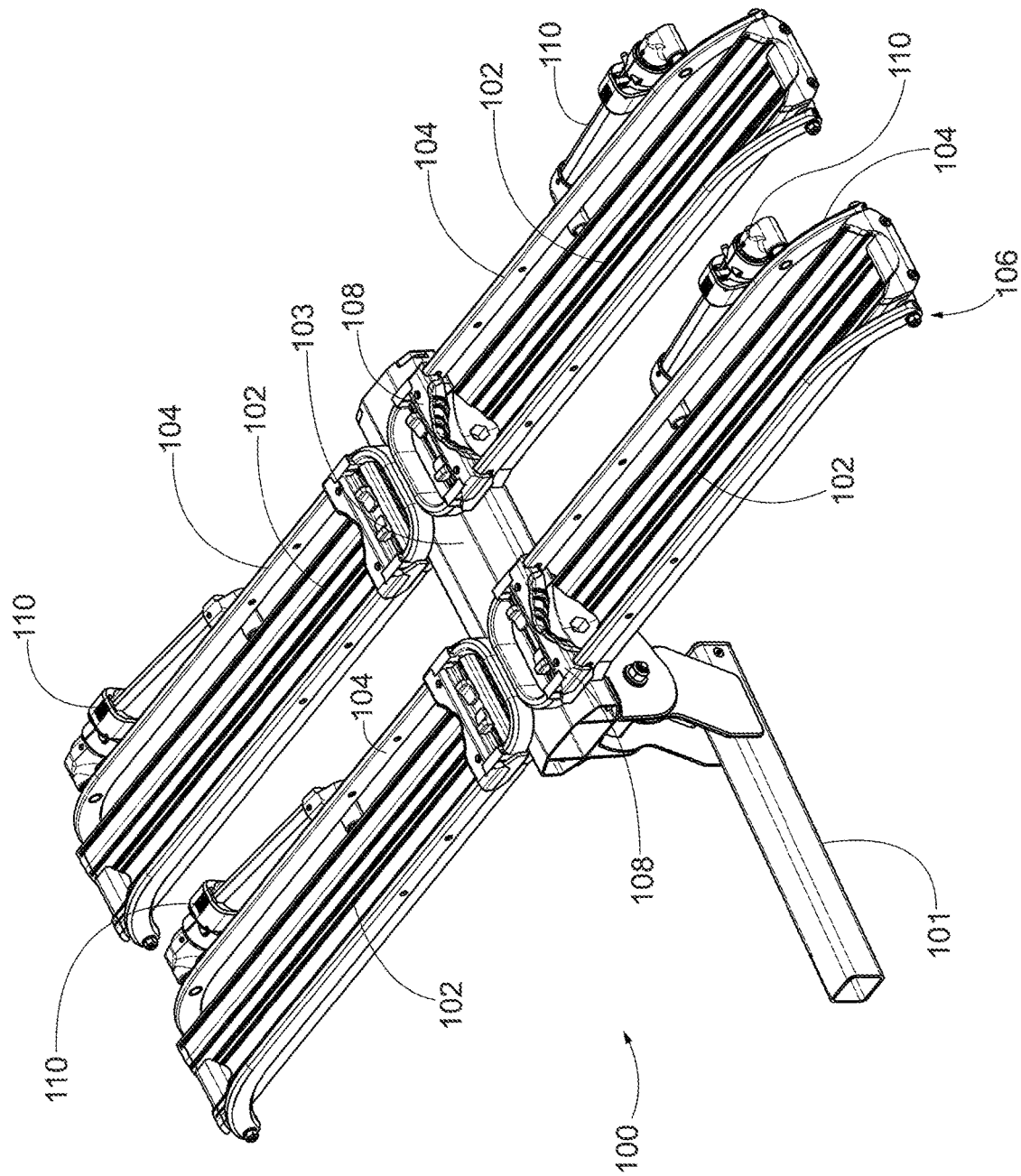
FIG. 1 is a perspective view of a bicycle rack incorporating an embodiment of the actuated arm mechanism.
Figure 2:
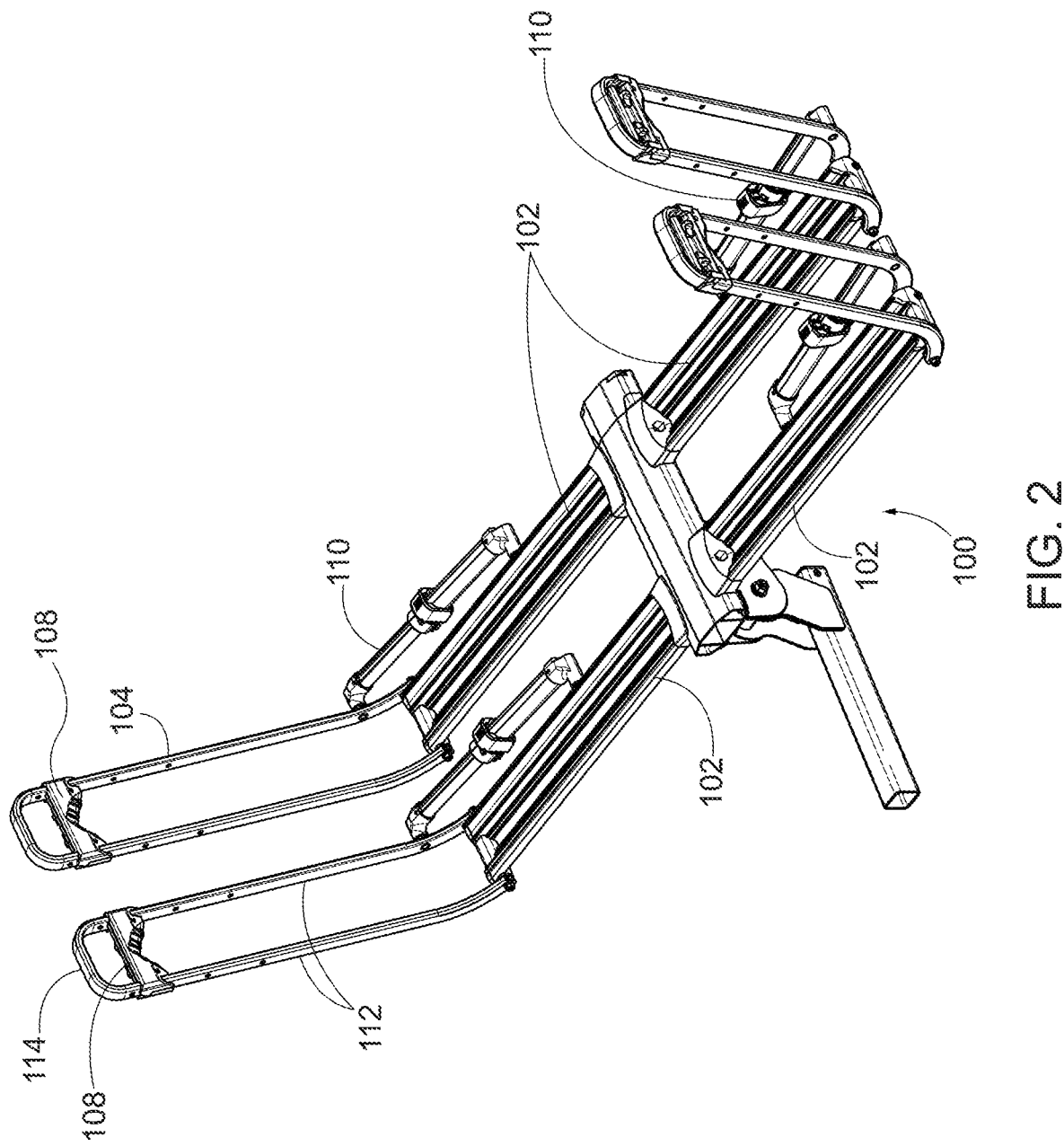
FIG. 2 is a perspective view of a bicycle rack incorporating an embodiment of the actuated arm mechanism.

When the arms 104 of the rack 100 are in the stowed position folded down against the platforms 102 as shown in FIG. 1, a user may activate one of the actuators 110 to cause the actuated arm 104 to pivot to an open position such as that shown in FIG. 2. Each actuated arm 104 may be operated independently of the other actuated arms 104, and in some cases, there may only be one actuated arm 104 on the rack 100. Once the necessary actuated arms 104 are in the open position a bicycle may be loaded onto the platforms 102, typically by placing the tires of the bicycle on opposing platforms 102.

The actuator 110 allows the user to pivot the actuated arm 104 back toward the stowed position without releasing or disengaging the actuator 110. Thus, the user may pivot the arm 104 back toward the rack with one hand until the arm 104 or the optional tire chock 108, is in contact with a bicycle tire or frame in a desired position thus securing the bicycle on the rack 100. In the depicted embodiment, the side arms 112 extend on either side of each tire of the bicycle to allow the tire chock 108 to contact a desired portion of the bicycle. When the user is unloading the bicycle, the actuator 110 may be actuated by the user causing the actuator 110 to pivot the arm 104 back to the open position away from the bicycle. In some embodiments the actuated arm 104 may rotate past the open position to allow a ramp to be attached to the rack for loading electric bicycles or other heavy bicycles.

FIGS. 1 and 2 depict an embodiment of a bicycle rack assembly 100 having several actuated arms 104. Referring now to FIG. 1, a perspective view of a bicycle rack 100 is depicted with actuated arms 104 in a closed or stowed position. In this embodiment of the assembly, the rack 100 provides support for two bicycles simultaneously, however in other systems using embodiments of the rack 100 there may be space for only one bicycle or for more than two bicycles. In some embodiments of bicycle rack assemblies that use the inventive actuator arm only one actuated arm 104 is provided on each part of opposing platforms or trays 102, and the opposing end of the bicycle may be secured using a different mechanism for securing the bicycle on the rack 100, such as a fixed bracket or a ratchet strap to hold the tire on the platform or tray 102. The different mechanism may also comprise a support frame for receiving a portion of the bicycle frame, a cradle for receiving a tire of the bicycle, a fixed cage for retaining the tire and wheel of a bicycle, or any other suitable type of bicycle rack.

In this embodiment, the rack 100 is supported by a drawbar 101 which is designed for attachment to a receiver hitch of a vehicle, however in other embodiments of the rack 100 it may be designed for attachment to a vehicle by straps or other similar attachments, or to a vehicle rooftop rack system, or in other embodiments it may not even be designed for mounting on a vehicle (such as a garage storage system). A support member 103 is attached to or formed as part of the drawbar 101. In the depicted embodiment the support member 103 is mounted to the drawbar 101 by an optional pivotal attachment mechanism.

In the depicted embodiment each bicycle on the rack 100 is supported by opposing platforms 102 extending outward from the support member 103. In this embodiment, an actuated arm 104 is attached at the outer end of each platform 102 by a pivotal attachment 106. A user releases (or actuates) the actuators 110 on the opposing platforms 102, causing the actuators 110 to extend and the arms 104 to pivot to the open position. A bicycle is then placed with one tire on each platform 102, and the arms 104 are pivoted toward the bicycle and adjusted to contact the frame or tires of the bicycle to secure it on the rack. The actuators 110 are provided with a latch mechanism that automatically engages as the arms 104 are pivoted toward the bicycle, so that the arms 104 cannot reopen until the latch mechanism is again released or disengaged by the user.

In the depiction in FIGS. 1 and 2, the actuated arms 104 are shown in a closed position and open position, respectively. When a bicycle is not stored on the rack 100, the actuated arms 104 are typically pivoted to the closed position to protect the rack assembly 100 from damage, to reduce wind noise and drag, and to allow access to the rear of a vehicle without removing the rack assembly 100 from the vehicle. When a user desires to place a bicycle on the rack 100, the user pivots the appropriate actuated arm 104 to an open position or at least far enough toward the open position so that the tire of a bicycle may be placed onto the platform 102. The user then pivots the actuated arm 104 back toward the tire or bicycle frame until contact is made between a retention component such as tire chock 108 on the arm 104 and the bicycle sufficient (in conjunction with other components of the bicycle rack assembly) to hold the bicycle on the rack 100.

In the embodiment depicted in FIGS. 1 and 2, the platforms 102 comprise structural supports with a wheel tray or cradle on the upper surface of the platform 102. The actuator 110 is pivotally attached to both the platform 102 and the actuated arm 104 of the rack assembly 100. In the depicted embodiment each arm 104 is formed from two side members 112 and a cross member 114 near or at the outer end of arm 104. This design allows a side member 112 to be positioned on each side of the bicycle tire when it is on the rack assembly 100. In some embodiments the arm 104 may only have one side member 112.

The actuators 110 may vary in specific function in different embodiments of the invention. The embodiments depicted in the figures utilize a gas spring to provide an extension force to pivot the arm 104 toward the open position. In other embodiments, the opening force may be provided by a different mechanism such as a compression spring. The actuator 110 is also provided with a latch mechanism that prevents the arm 104 from pivoting away from the platform 102 while allowing the arm 104 to pivot toward the platform 102 without restraint. In this context pivoting "away" from the platform connotes an increasing angle between the platform 102 and the arm 104. Conversely, pivoting "toward" the platform connotes a decreasing angle between the platform 102 and the arm 104. For purposes of this description, the angle between the arm and the platform is measured from the surface of the platform on which the bicycle tire will rest.

In the depicted embodiment shown in FIGS. 1 and 2, the arm 104 is pivotally attached to the platform 102 at a point near the outer ends of arms 104. In some embodiments the arm 104 may be attached at any point along the length of frame 102. The pivotal attachments 106 used in the rack 100 may be accomplished by pivot pins, bolts, bearings, bushings, rods, brackets, a combination of the foregoing, or any other device or method of attachment known for pivotal connections.

FIGS. 3-8 depict one embodiment of the actuator 110. In the depicted embodiment, the actuator 110 comprises an extendable mechanism 116 (such as a gas spring having a cylinder 124 and piston 118) that is pivotally attached to the platform 102 at a first end thereof, and pivotally attached to actuated arm 104 at a second end thereof. The actuator 110 is designed to extend thus exerting an opening force on actuator arm 104 that will cause it to automatically pivot to an open position unless it is held in another position by an opposing force.

In some embodiments, the opposing force may be provided by a separate mechanism, referred to herein as a latch mechanism, attached to the bicycle rack separately from the actuator. In other embodiments, the latch mechanism may be part of the actuator 110, attached to the actuator 110, or otherwise incorporated into the actuator 110 or its structure.

The latch mechanism selectively opposes the force exerted by the actuator 110 to prevent the actuated arm 104 from further extension or opening unless a user releases the latch mechanism. When the latch mechanism is in a closed position it prevents the actuator 106 from extending beyond its current position. Once a user moves the latch mechanism to an open position, the unopposed opening force exerted by the actuator 110 on actuated arm 104 causes it to pivot away from the closed position to an open position as shown in FIG. 2.

In various embodiments, the latch mechanism may require the user to hold a trigger, a button, or other release mechanism or member in an open position to allow the actuator 110 to extend, and when the user releases the release mechanism, it may immediately engage the latch mechanism and stop further extension of the actuator 110. In a preferred embodiment, once a user triggers the release mechanism it may remain open until the actuator 110 extends to a predetermined extension or for a certain period of time, and then the latch mechanism may engage to hold the actuator 110 at a certain desired length of extension. In various embodiments, the latch mechanism is designed to allow a user to release the latch mechanism and cause the actuated arm 104 to pivot to the open position with a single hand. In preferred embodiments the latch mechanism is designed to allow the user to cause the actuated arm 104 to pivot from an open position to a locked position against a bicycle without re-actuating the release mechanism.

In the embodiment depicted in FIGS. 3-8, the latch mechanism is incorporated into the mechanism of the actuator 110. In other embodiments, the actuator 110 and the latch mechanism may be provided as separate components. In the depicted embodiment the latch mechanism comprises a ratchet and pawl system to hold the actuator 110 in a desired position, and a release component that the user operates to release the ratchet so that the actuator 110 may extend as desired. In this embodiment, when the user presses the release component the actuator 110 automatically extends from its current position to an extended position such as that shown in FIG. 2, thus causing actuated arm 104 to pivot from the closed position shown in FIG. 1 to the open position shown in FIG. 2.

The maximum extension of actuator 110 may vary in different embodiments of the bicycle rack and actuator 110. In some embodiments the actuator 110 extends to a length that causes actuated arm 104 to pivot to an open position that is displaced between 90 and 180 degrees from the closed position against platform 102. The latch mechanism may be closed at any point in the extension range of the actuator 110 so that the actuated arm 104 may be fixed at any angle between the closed position and the open position. This allows the actuated arm 104 to be fixed in a desired position against a bicycle tire or frame to secure the bicycle on the rack 100.

Figure 3:
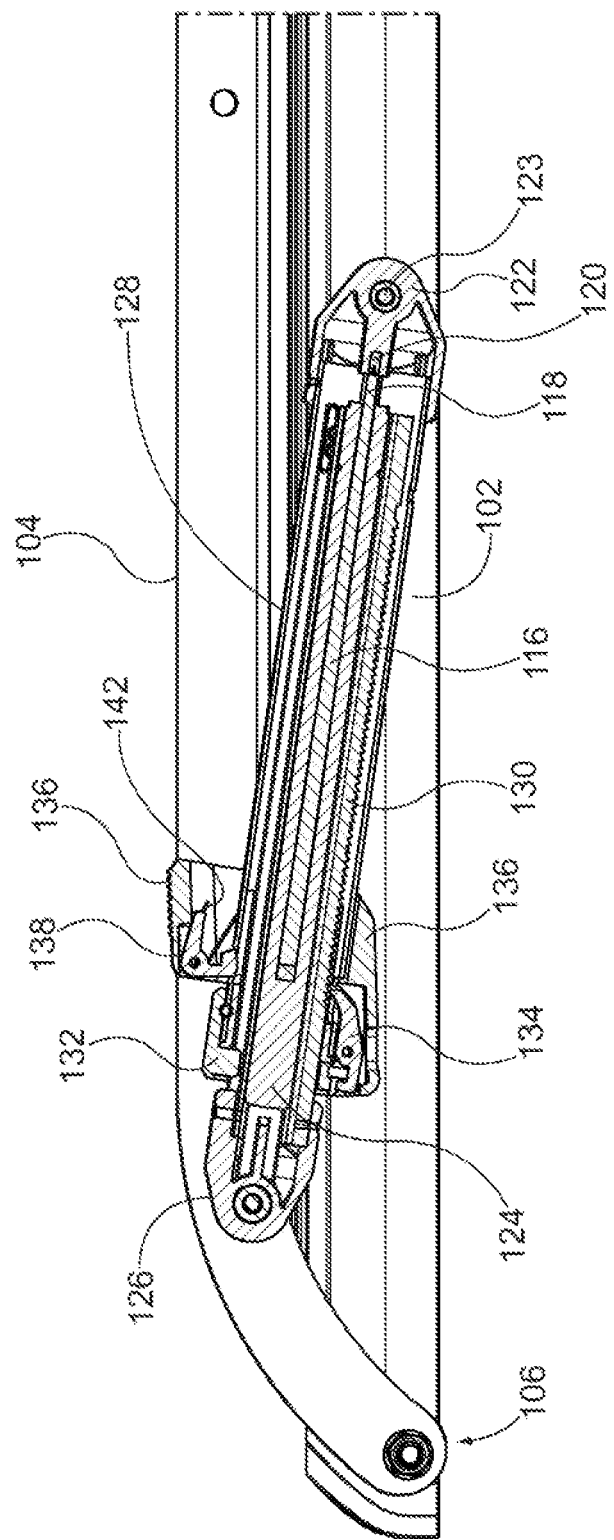
FIG. 3 is a cross-sectional view of an embodiment of the actuated arm mechanism.
Figure 4:
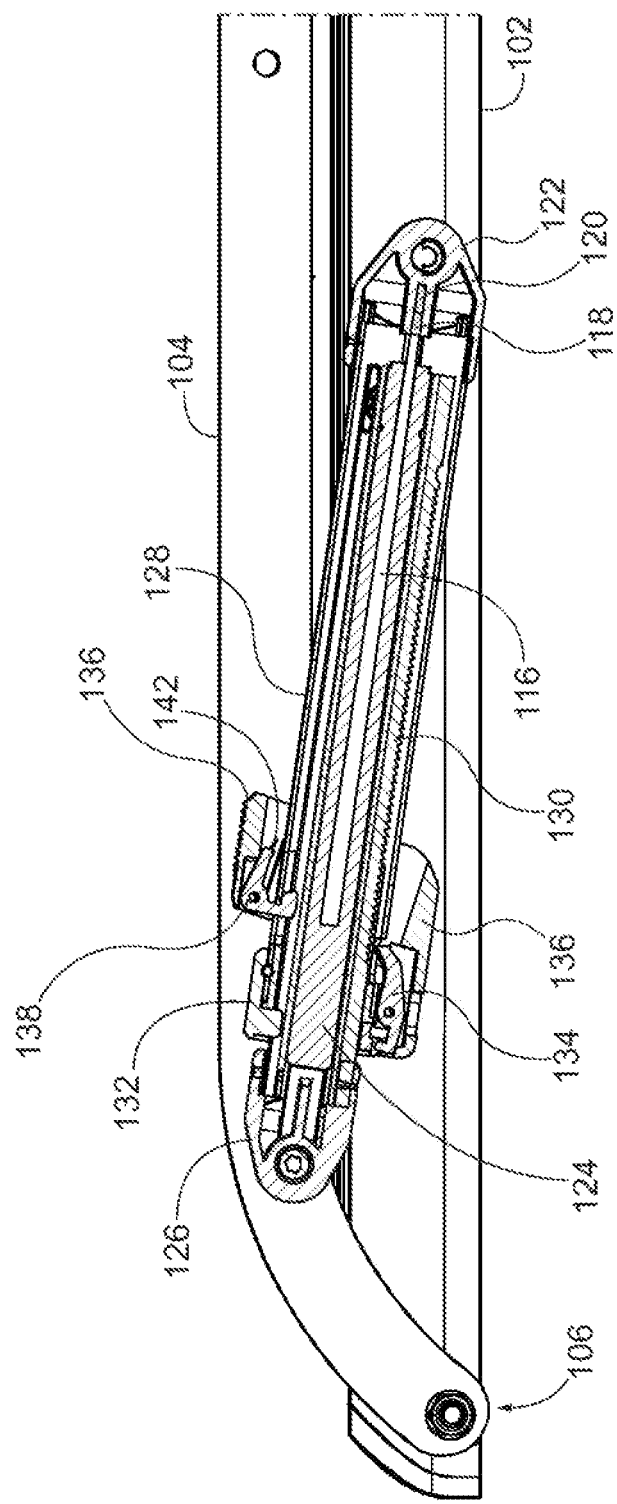
FIG. 4 is a cross-sectional view of an embodiment of the actuated arm mechanism.
Figure 5:
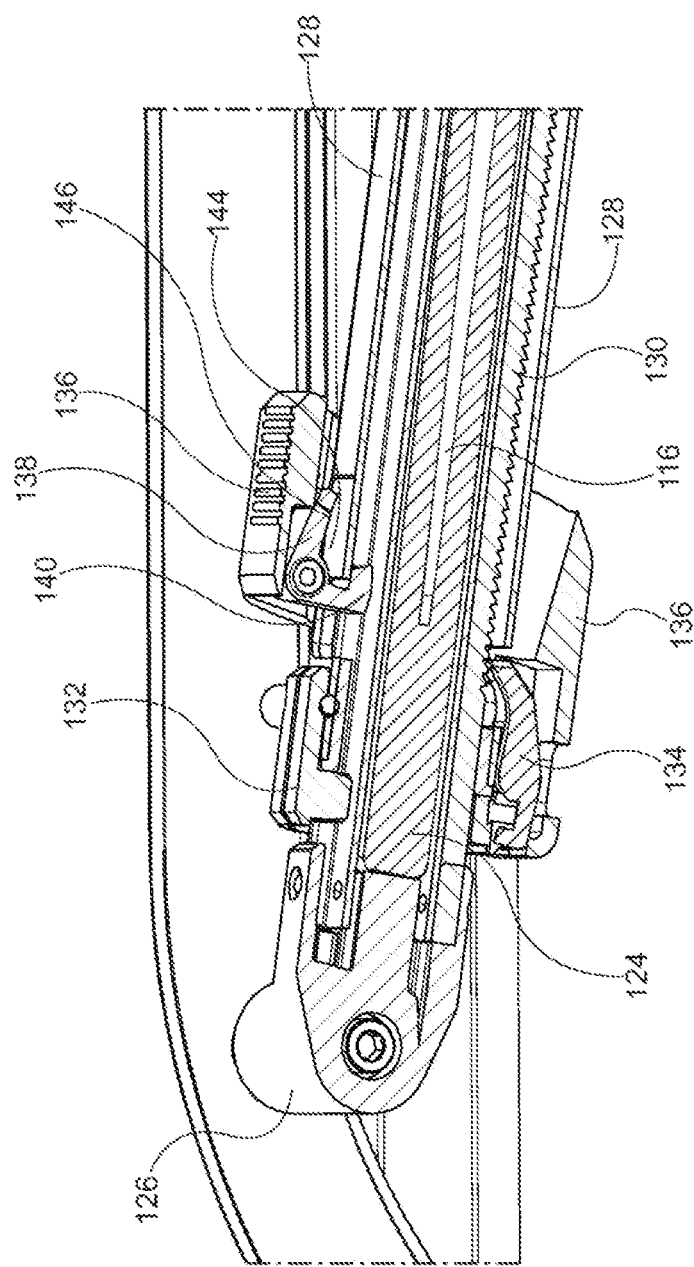
FIG. 5 is a cross-sectional view of an embodiment of the actuated arm mechanism.
Figure 6:
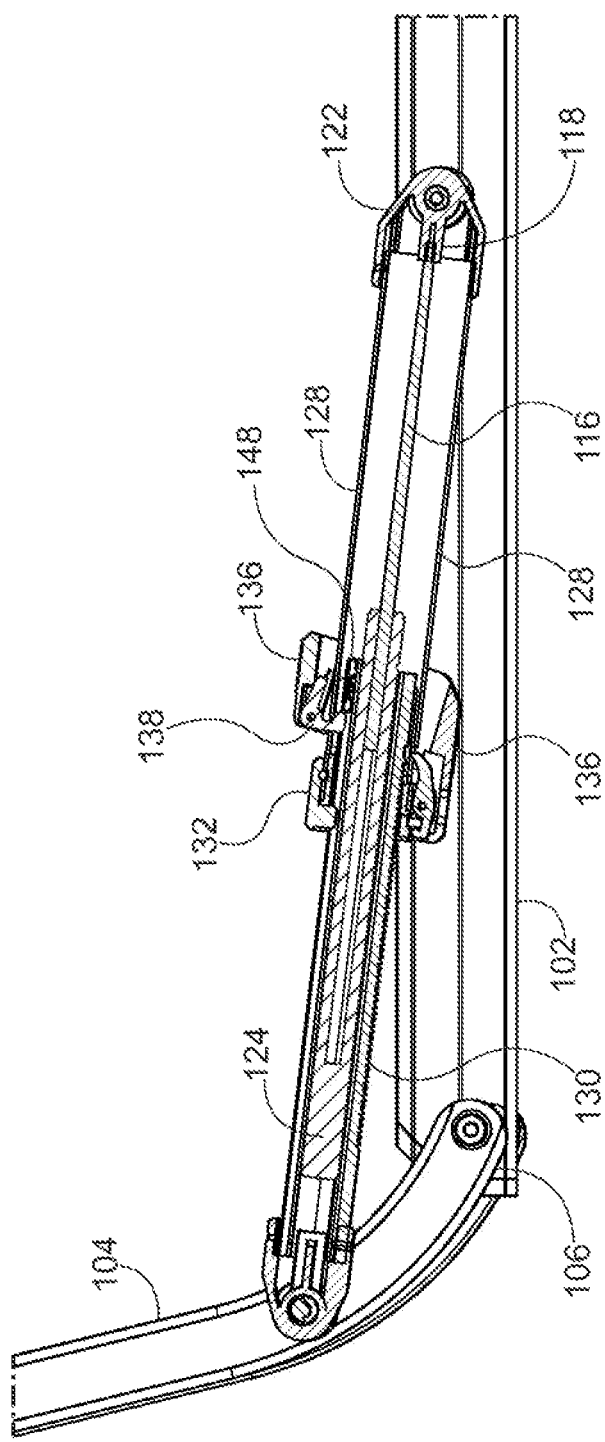
FIG. 6 is a cross-sectional view of an embodiment of the actuated arm mechanism.
Figure 7:
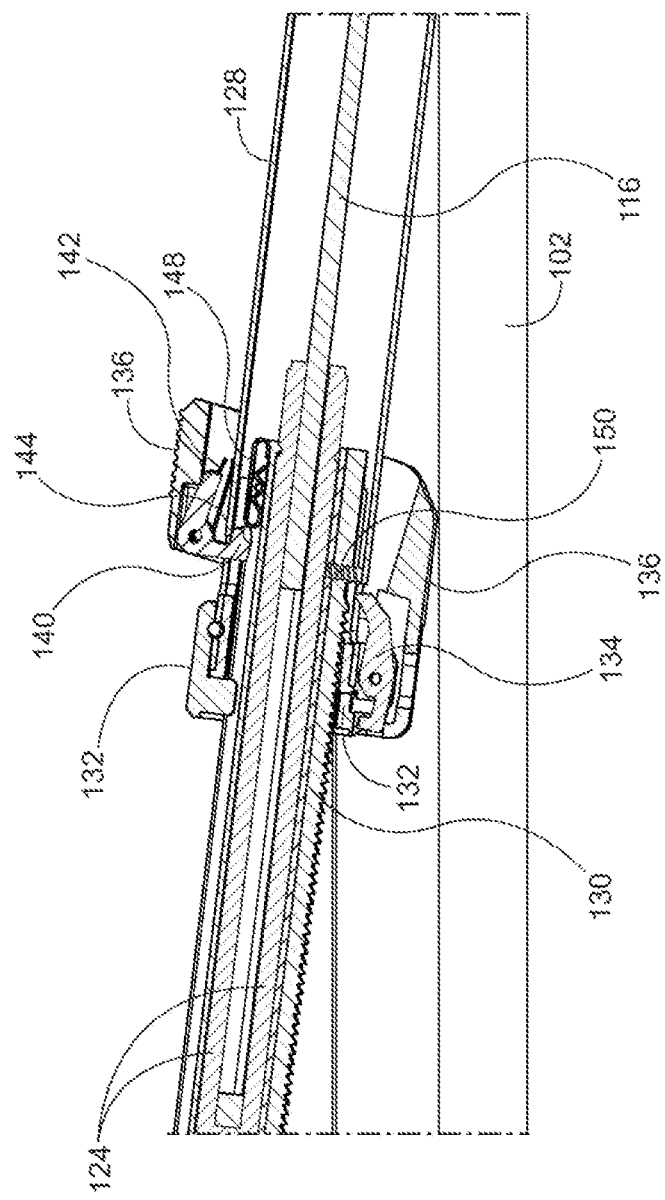
FIG. 7 is a cross-sectional view of an embodiment of the actuated arm mechanism.
Figure 8:
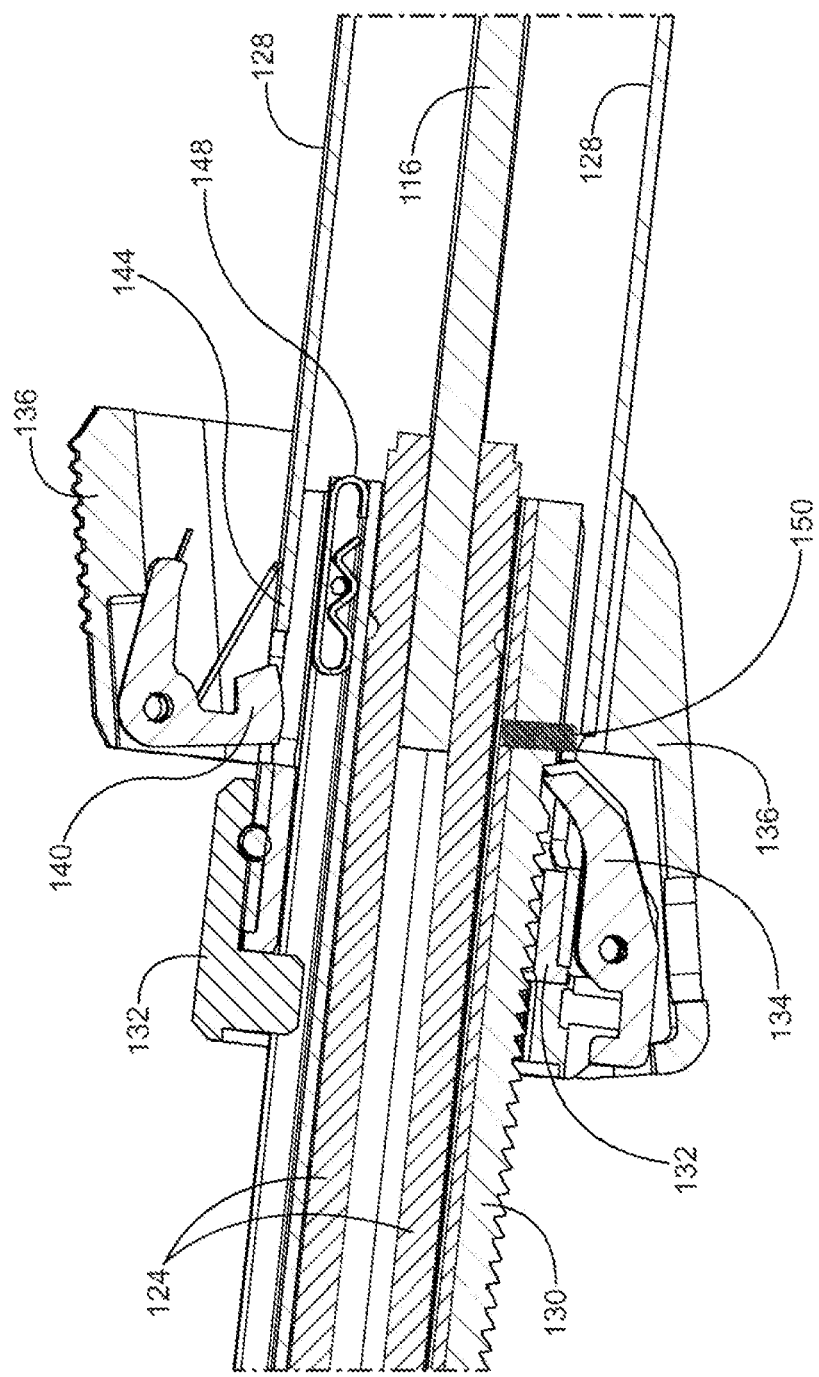
FIG. 8 is a cross-sectional view of an embodiment of the actuated arm mechanism.

Referring now to FIGS. 3 through 8, cross-sectional views of an embodiment of an actuator 110 along its length are depicted at various positions and configurations. FIG. 3 shows an embodiment of the actuator 110 in a retracted, engaged configuration. FIG. 4 shows the same embodiment of the actuator 110 in a retracted, disengaged configuration just after a user has disengaged the latch mechanism of the actuator 110. FIG. 5 is a detail cross-sectional view with some perspective of the latch mechanism of the embodiment in the same configuration as FIG. 4. FIG. 6 depicts the same embodiment of the actuator 110 in an extended, disengaged configuration, just before the latch mechanism automatically re-engages at the nominal full extension point. FIG. 7 depicts a detail view of the latch mechanism of the actuator 110 in the same configuration as FIG. 4. FIG. 8 is a detail cross-sectional view of the latch mechanism in an extended, engaged configuration.

In the description of the figures and the embodiments, the terms "extended" and "retracted" refer to whether the actuator 110 has a longer or shorter length, respectively. The term "engaged" refers to the configuration where the latch mechanism is engaged to hold the actuator 110 at its current length. The term "disengaged" refers to the configuration where the latch mechanism is disengaged so that the actuator 110 is free to extend under the force of the spring or other extending force.

This embodiment of the actuator 110 partially comprises a spring that exerts an extending force to pivot the arm 104 into an open position, unless countered by another force to prevent extension. The depicted actuator 110 comprises a gas spring but in other embodiments of the actuator 110, the gas spring may be replaced with another kind of extension spring that will tend to cause the actuator 110 to extend to the extended, open position.

In the embodiment shown in FIGS. 3-8, the opposing ends of the actuator 110 are provided with attachment brackets 122 and 126 to allow the actuator 110 to be pivotally attached to different components of the rack 100 at each end thereof. The first bracket 122 is attached to the outer tube or housing 128 of the actuator 110. The gas spring 116 in this depicted embodiment operates in the manner of known gas springs. A gas spring body or cylinder 124 and gas spring shaft or piston 118, disposed in a channel in the cylinder 124, provide the extending force for the actuator 110. The gas spring shaft 118 attaches at a first end 120 to bracket 122. The gas spring cylinder 124 fits inside housing 128 and slides in and out of the housing 128 as the actuator 110 extends and retracts. The gas spring cylinder body 124 is disposed inside tube 125 that is attached to bracket 126 that is pivotally attached to actuated arm 104. In some embodiments the cylinder body 124 may slide within tube 125 as shown by FIGS. 5 and 6, showing the space 127 created between the cylinder body 124 and the bracket 126 as cylinder body 124 slides within tube 125.

In this embodiment, the latch mechanism comprises a linear ratchet 130 and a pawl 134. In some embodiments the linear ratchet 130 is attached to the cylinder 124 of the gas spring 116 or the tube 125 as shown in FIGS. 5, 6, and 7, among others. The linear ratchet 130 comprises a series of ratchet teeth angled toward the bracket 126. The pawl is attached to the housing 128 on a release member or actuator 136. The release actuator 136 in this embodiment comprises a movable collar that is pivotally attached to the housing 128, in this case by attaching it to a collar 132 fixed on the housing 128. The pawl 134 and release actuator 136 cooperate to engage and disengage the ratchet pawl 134 from the linear ratchet 130 to prevent or allow the extension of the gas spring 116.

In the engaged configuration shown in FIG. 3, the tooth of ratchet pawl 134 engages one of the ratchet teeth of linear ratchet 130 and prevents the extension of the gas spring 116. When a user depresses release actuator 136 toward the housing 128, the release actuator 136 pivots and pulls the ratchet pawl 134 away from linear ratchet 130. In this disengaged position the gas spring 116 is allowed to extend to the desired open position. In this embodiment the ratchet pawl is pivotally attached to the release actuator 136 so that it can pivot slightly to allow its tooth to travel over the teeth on linear ratchet 130 as the actuator 110 retracts, while not pivoting when the actuator extends. In the depicted embodiment, the range of this pivoting is controlled by the arm extending from the opposite side of the ratchet paw 134 which contacts portions of the release actuator 136 at the desired range of motion. In other embodiments, the ratchet pawl may have a semi-flexible tooth.

In this embodiment, when the release actuator 136 is depressed the ratchet pawl 134 will stay disengaged from the ratchet strip 130 until the gas spring 116 reaches a predetermined extension, at which time it will automatically re-engage the ratchet pawl 134 and linear ratchet 130. In this embodiment the release actuator 136 is kept in the disengaged position by detent component 138 which is attached to the release actuator 136. The detent 138 includes a tang or flange 140 that extends adjacent to an aperture with edge 144 of the housing 128. In the depicted embodiment the detent 138 is attached to the release actuator 136 by a pin and may pivot slightly so that the detent tang 140 may pass through the aperture in housing 128 and catch the edge 144 of housing 128. In other embodiments the detent 138 may be formed as part of the release actuator 136 or may be a flexible component instead of pivotally mounted to the release actuator 136. In this embodiment the detent 138 has a detent lever 146 that contacts an inner surface of the release actuator 136, and a detent tang 140 that extends toward the aperture in housing 128. As shown in FIGS. 4 and 5, when the release actuator 136 is pivoted to disengage the pawl 134, the detent tang 140 captures the edge 144 of housing 128 to hold the release actuator 136 in the disengaged position. In this embodiment the detent tang 140 has a lip or protrusion that extends through the aperture in the housing 128 and presses against the inside of the housing 128 adjacent to edge 144.

In this embodiment a biasing mechanism 142 is provided to bias the release actuator 136 toward the engaged position. In the disengaged position, biasing mechanism 142 also holds the edge 144 against the detent tang 140 by applying a force that tends to pull the detent tang 140 against the inside surface of the housing adjacent to edge 144. In this embodiment the biasing mechanism is a torsion spring with arms that press outwardly in opposite directions against an inner surface of release actuator 136, or as shown in FIG. 8 the detent lever 146, and an outer surface of housing 128.

Referring to FIGS. 6 and 7, the embodiment of the actuator arm 110 is shown just as it reaches its desired maximum extension. The detent tang 140 is still hooked on edge 144 of housing 128, however it is now in contact with a stop member 148 that is attached to the cylinder body 124, or in the depicted embodiment to tube 125. As the gas spring 116 extends, the cylinder 124 extends out from housing 128. When the stop member 148 contacts the detent tang 140 the stop member 148 pushes the detent tang 140 off of the edge 144. Once the detent tang 140 no longer engages the edge 144, the biasing mechanism 142 causes the release actuator 136 to pivot back to the engaged position as shown in FIG. 8. In some embodiments the outer housing 125 of gas cylinder 124 may be provided with a longitudinal groove for receiving the stop member 148. In those embodiments, the stop member 148 may be movable within the groove to adjust the position at which the actuator 110 will automatically re-engage the ratchet pawl of the latch mechanism.

Figure 9:
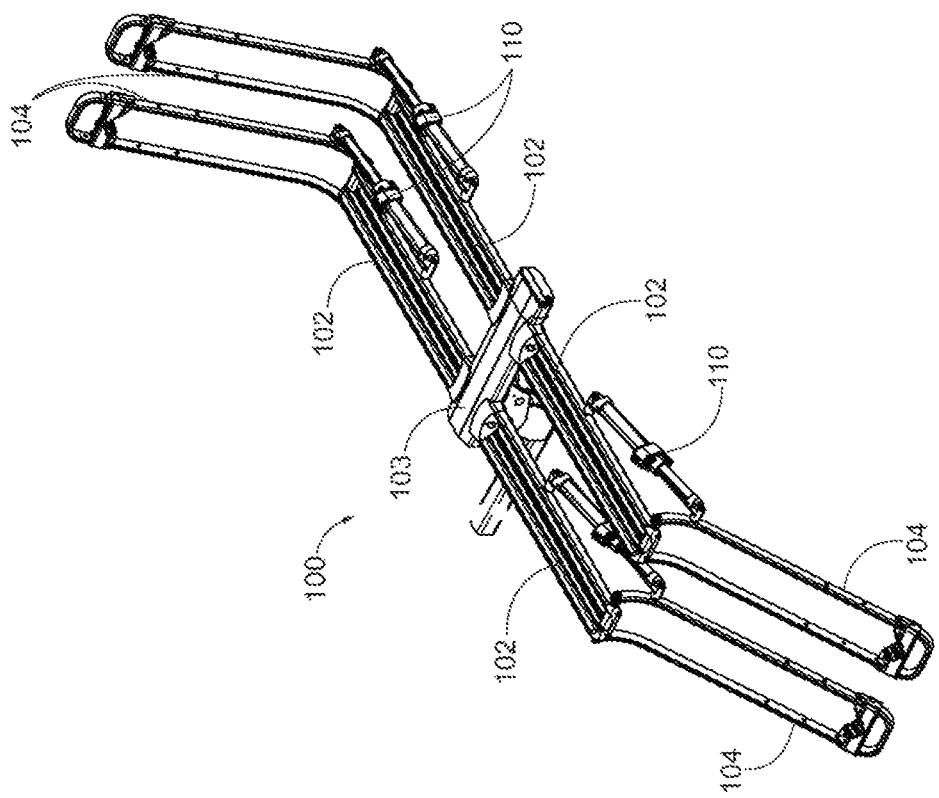
FIG. 9 is a perspective view of a bicycle rack incorporating an embodiment of the actuated arm mechanism.
Figure 10:
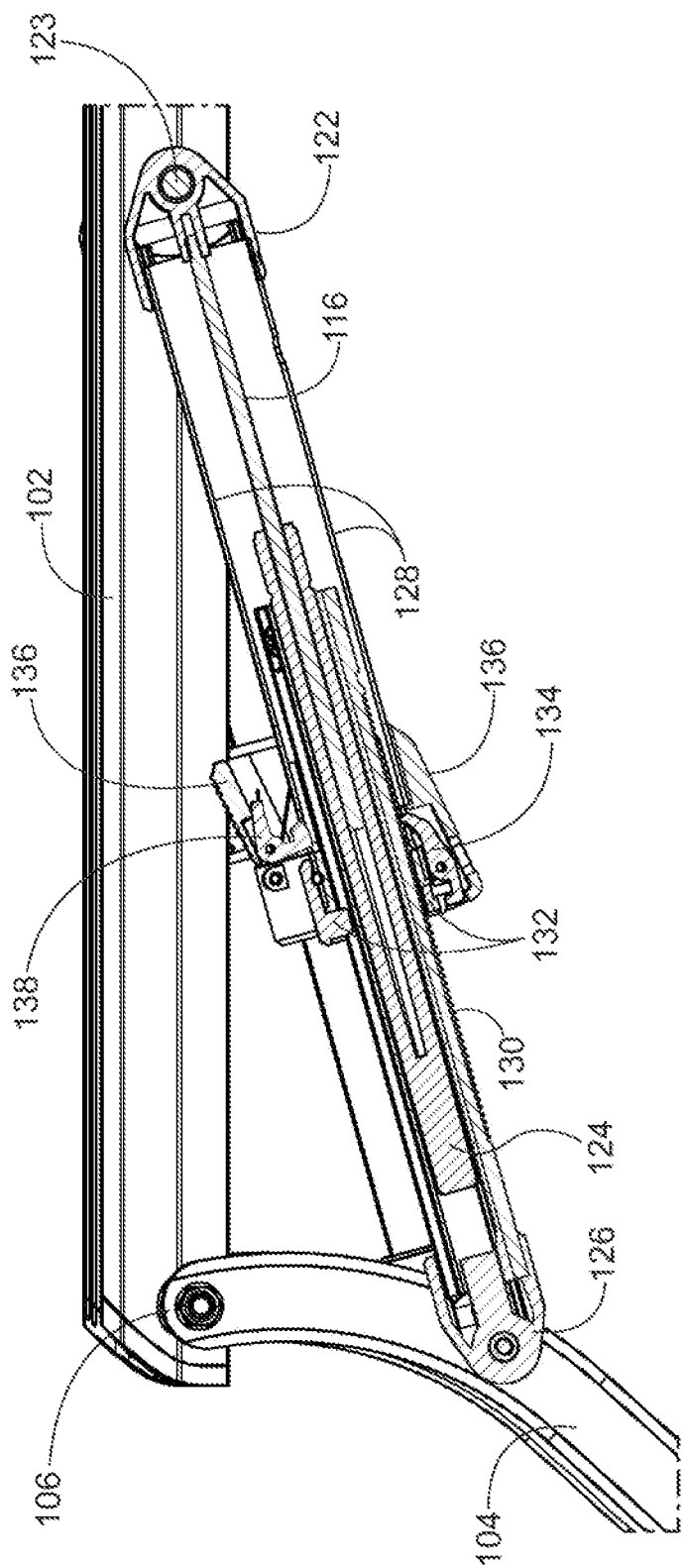
FIG. 10 is a cross-sectional view of an embodiment of the actuated arm mechanism.
Figure 11A:
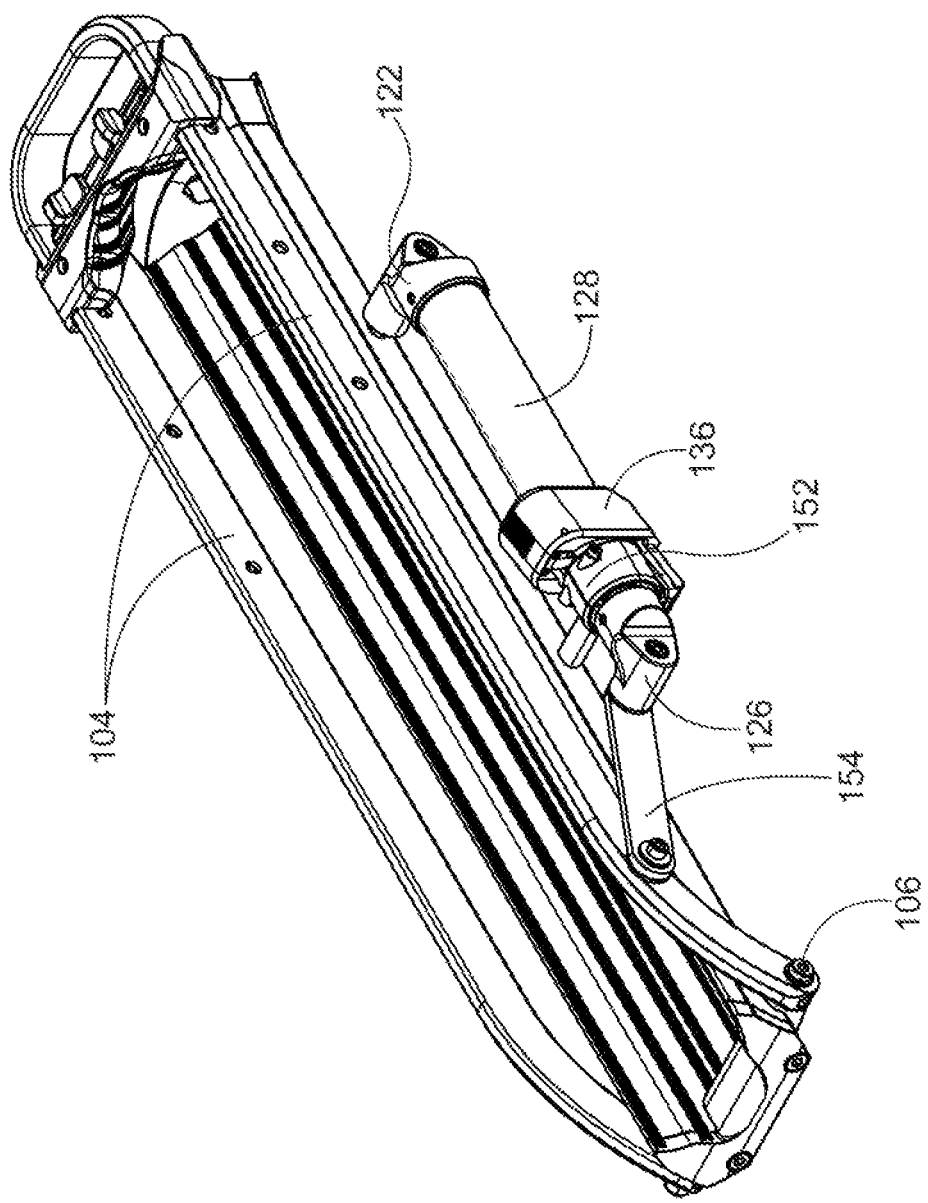
FIG. 11A is a perspective view of an additional embodiment of the actuated arm mechanism.
Figure 11B:
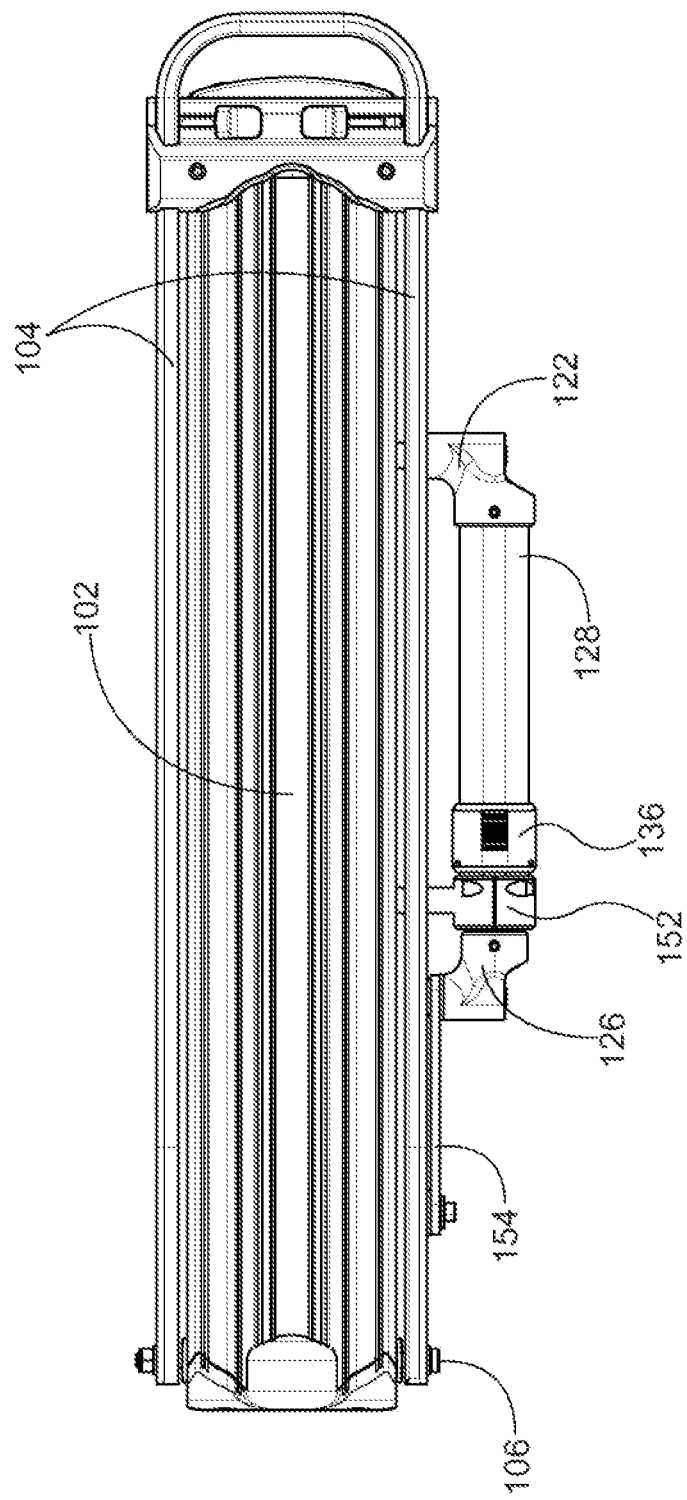
FIG. 11B is a top view of an additional embodiment of the actuated arm mechanism.
Figure 11C:
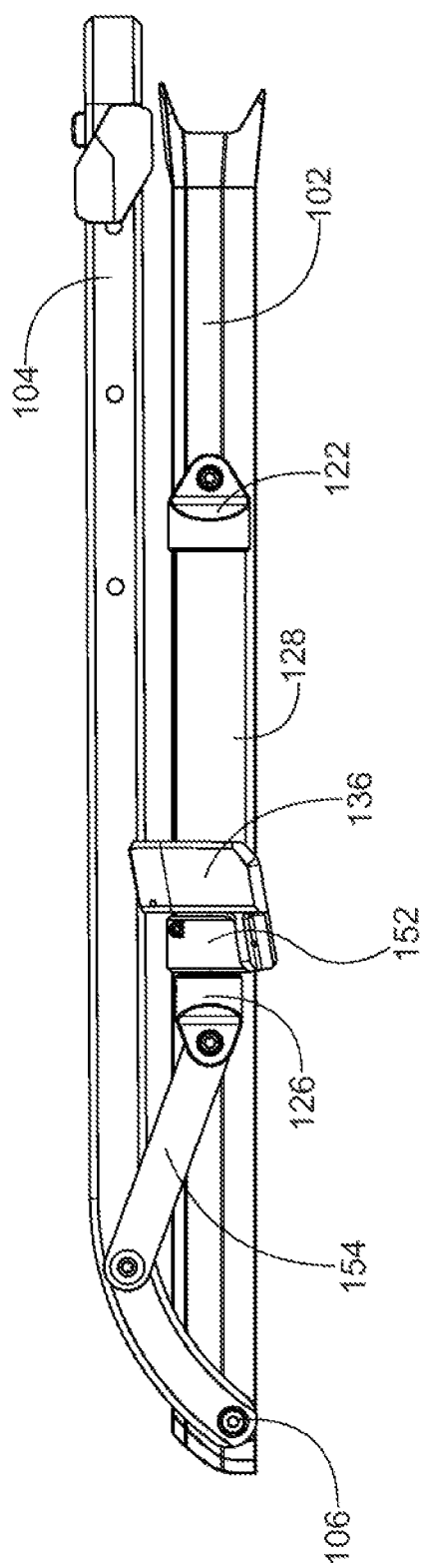
FIG. 11C is a side view of an additional embodiment of the actuated arm mechanism.
Figure 11D:
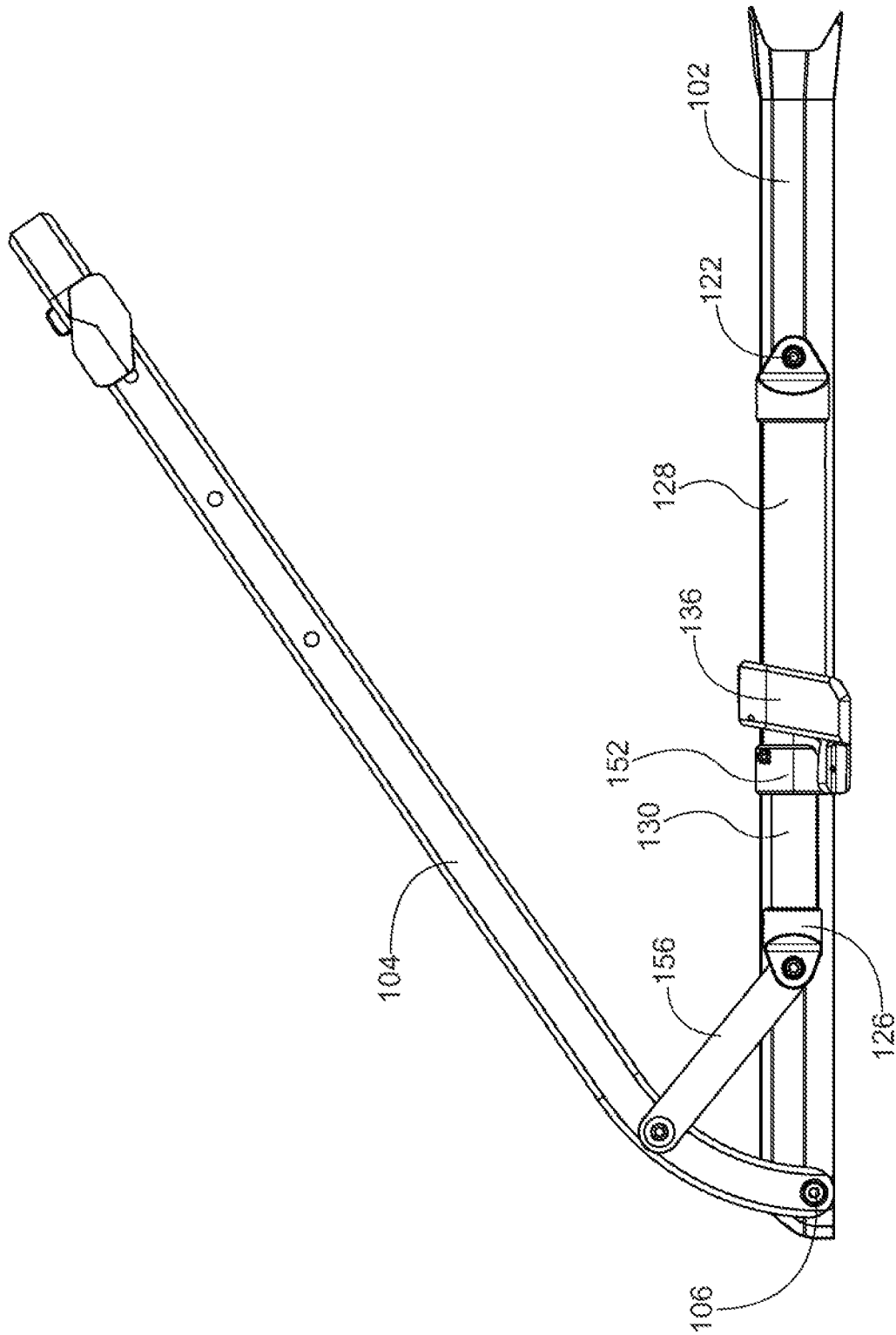
FIG. 11D is a side view of an additional embodiment of the actuated arm mechanism.
Figure 11E:
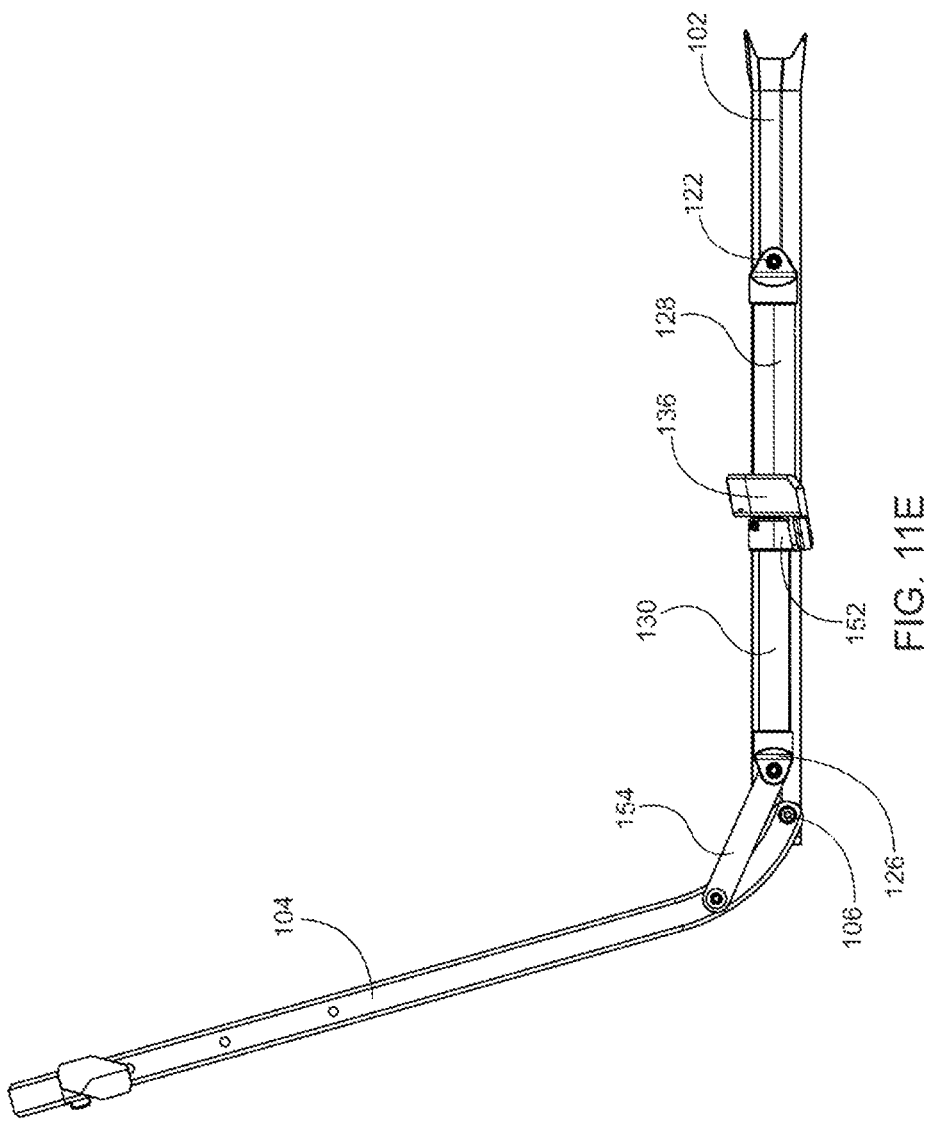
FIG. 11E is a side view of an additional embodiment of the actuated arm mechanism.

In the depicted embodiment a limit screw 150 is removably attached to the housing 125 of cylinder body 124. This limit screw 150 prevents the actuator 110 from extending beyond a desired maximum extension even if a user disengages the latch mechanism and manually pushes arm 104. In this embodiment the limit screw 150 may contact the ratchet pawl 134 or some part of housing 132 when the user attempts to overextend the actuator 110. In some cases, such as loading a heavy bike using a ramp, it may be desirable to pivot one or more of the arms 104 to the position shown in FIG. 9, where they are rotated more than 180 degrees from the closed position shown in FIG. 1. Removal of the limit screw 150 allows a user to disengage the latch mechanism and manually pivot the arm 104 beyond the normal limit of extension, including past 180 degrees. Once the actuator 110 is within its normal operating extension in the position shown in FIG. 9 the actuator 110 can be operated using the latch mechanism as described above. FIG. 10 depicts a cross-sectional view of the actuator 110 with the arm 104 in the over-rotated position.

In some embodiments of the latch mechanism, the device does not incorporate a powered actuator such as the gas spring 116. In these embodiments the cylinder body 124, housing 128, the latch mechanism, and the other components of the actuator function in the same way, except when the latch mechanism is disengaged a user must manually apply force to the arm 104 to move it to an open position. The latch mechanism still functions to remain disengaged while the arm 104 opens to a desired position, and to automatically re-engage and stop further outward pivoting of the arm at the desired position. The arm may still be rotated "over-center" as shown in FIG. 9. The only difference is that the movement of the arm is powered by the user. In some of these embodiments, the latch mechanism may only remain disengaged while the user presses the release actuator 136, or it may remain engaged until a desired position is reached by the arm 104 or the extending connector has extended to a desired position, just as with the powered actuator 110.

In these embodiments without a powered actuator, the actuator without the gas spring or other force-applying components may be referred to as an extending connector 110, because its function is to connect the arm 104 to the tire tray 102 and to control the relative positions of those two components. The latch mechanism may function the same as in the other embodiments, but when the latch is disengaged the extending connector 110 does not move the arm 104 by its own power. A user must apply force to the arm 104 to cause it to pivot toward the open direction.

An alternative embodiment of the rack with the actuated arm is depicted in FIGS. 11A through 11E. In this embodiment the gas spring housing 128 is fixedly attached to the platform 102 by brackets 122 and 152. The end of housing 125 of cylinder body 124 is attached at bracket 126 to a linkage arm 154. The linkage arm 154 is pivotally attached at its ends to the bracket 126 and the actuated arm 104. In this embodiment, the actuator 110 and release actuator 136 operate in the same manner as the previous embodiment. When a user depresses the release actuator 136 in the closed position shown in FIGS. 11A, 11B, and 11C, the cylinder body 124 begins to extend and pushes linkage arm 154 and arm 104 through a pivotal motion shown in FIG. 11D to an open position shown in FIG. 11E.

In other embodiments, different latch mechanisms may be used to control the extension of the spring and the actuator. For example, a friction-based mechanism may be utilized to control the extension and retraction of the actuator. In some of these embodiments, a retention member is pivotally mounted on the housing of the gas spring. The retention member is provided with a frictional interface, or surface, that selectively contacts the outer surface of the gas cylinder to prevent it from moving. A release lever may be attached to the retention member to allow a user to pivot the retention member and release the cylinder.

In other embodiments of the actuator 110 the latch mechanism may utilize a collet and tapered sleeve inside the gas spring to prevent extension of the actuator. The collet may be slidably attached to the spring shaft and biased with a compression spring to push the collet away from the gas spring body toward a tapered sleeve. The tapered sleeve is provided in connection with the gas spring body. The compression spring pushes the collet against the tapered sleeve creating a bind between the collet, the spring shaft, and the tapered sleeve, thus preventing the extension of the actuator. A release mechanism may comprise a component that slidably pushes the collet away from the tapered sleeve to release the gas spring.

In some additional embodiments of the bike rack 100 the latch mechanism is not attached to the actuator 110 but to another part of the rack 100. For example, a rotational ratchet maybe fixedly attached to the actuated arm at its pivot point so that the rotational ratchet and the actuated arm pivot together. A pawl and release lever may be provided by pivotal attachment to the platform 102 of the rack 100. The pawl and release lever engage the rotational ratchet to prevent rotation of the actuated arm in one direction while permitting it in the other direction. A release mechanism is provided to release the ratchet and pawl so that the arm can be pivoted in both directions when desired.

Adjustable Tire Chock

In some embodiments of the bicycle rack 100, the actuated arms 104 are provided with adjustable tire chock components 108 that contact the bicycle tires when the bicycles are secured on the rack 100. The tire chocks 108 are generally visible in FIGS. 1 and 2, but are shown in more detail in FIGS. 12A, 12B, 12C, and 12D. The tire chocks are slidably adjustable along the length of the actuated arms 104. In the depicted embodiment, the body of tire chock 108 is formed from one or more pieces of plastic or other suitable material.

The tire chocks 108 have a body with features, apertures, or slots that slidably engage the side members 112 of the actuated arm 104 to keep the tire chock 108 in the right orientation to the arm 104. The body 108 of the tire chock is provided with grooves or other features to support and guide at least one retractable pin 156 that selectively engages the arm 104 to hold the tire chock in a desired position on the arm 104. The pins 156 are preferably attached to one or more release actuators 158 to allow a user to retract the pins 156 from engagement with the arm 104. The actuated arms 104 are provided with one or more apertures or holes 160 to receive and engage the retractable pins 156.

In the depicted embodiment the two retractable pins 156 are disposed opposite one another on the tire chock body. In this embodiment the user squeezes the two release actuators 156 toward each other to simultaneously retract both pins 156. A biasing mechanism such as compression spring 162 may be provided to bias the retracting pins 156 to move outwardly into the engaged position. In FIG. 12C the tire chock body 108 has been cut-away to show the spring 162 that is disposed in a cavity inside the tire chock. The release actuators may be actuated by a user with one hand so that the other hand may be used to hold a bicycle while the tire chock is adjusted.

Figure 12A:
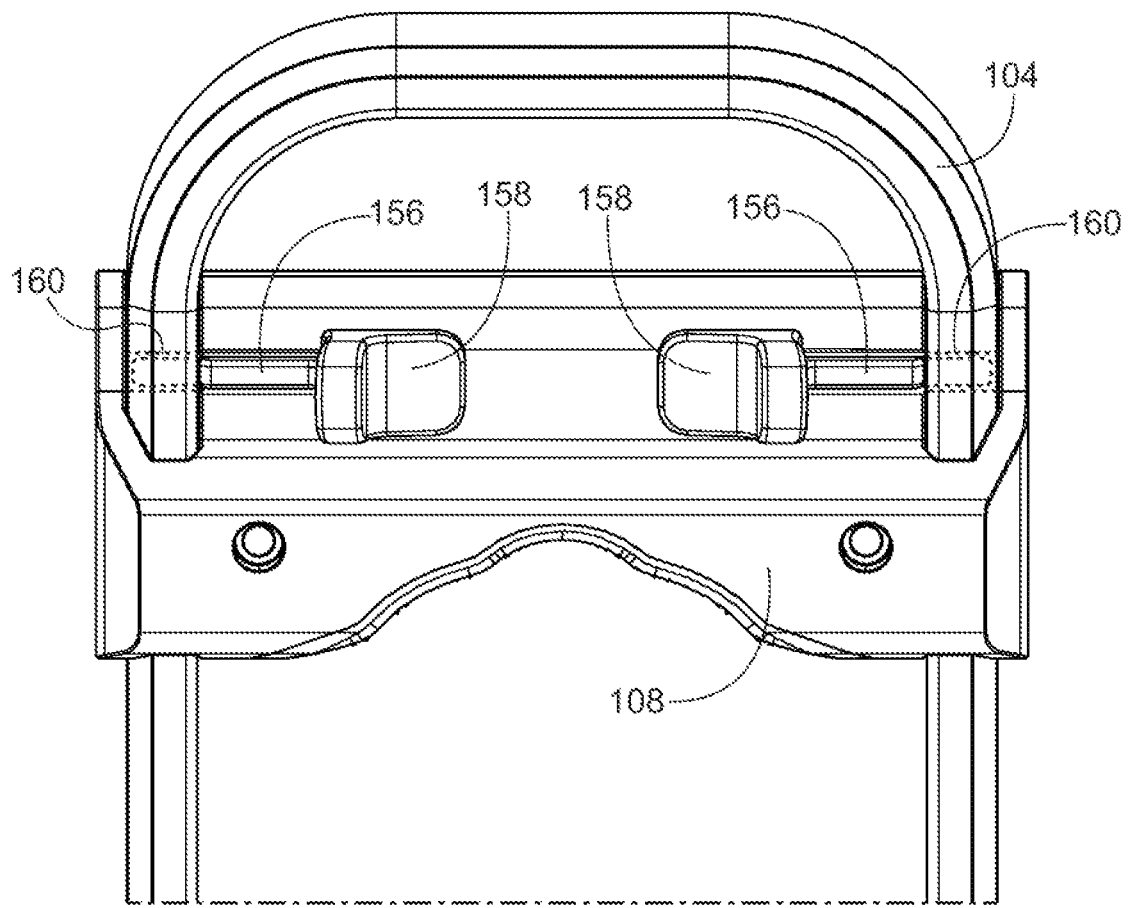
FIG. 12A is a front view of a tire chock used with an embodiment of the actuated arm mechanism.
Figure 12B:
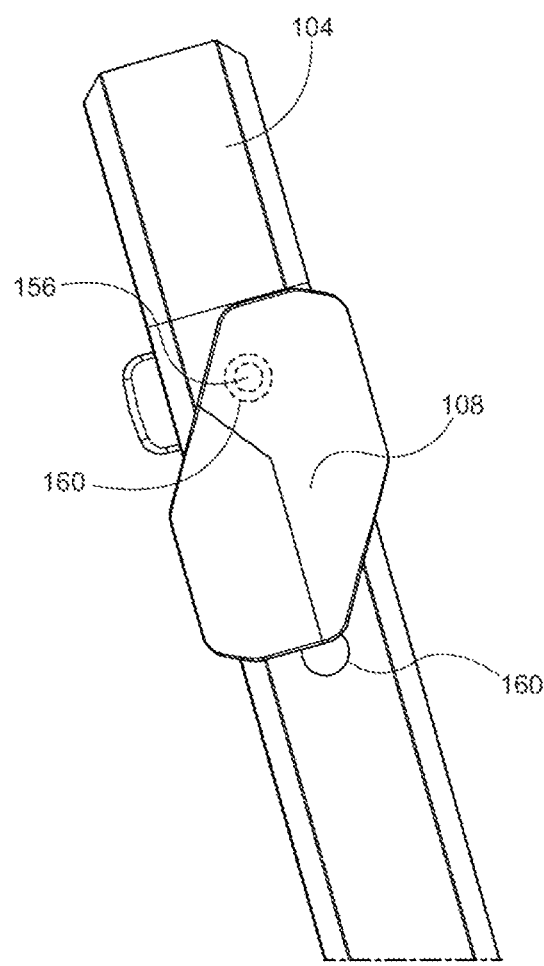
FIG. 12B is a side view of a tire chock used with an embodiment of the actuated arm mechanism.
Figure 12C:
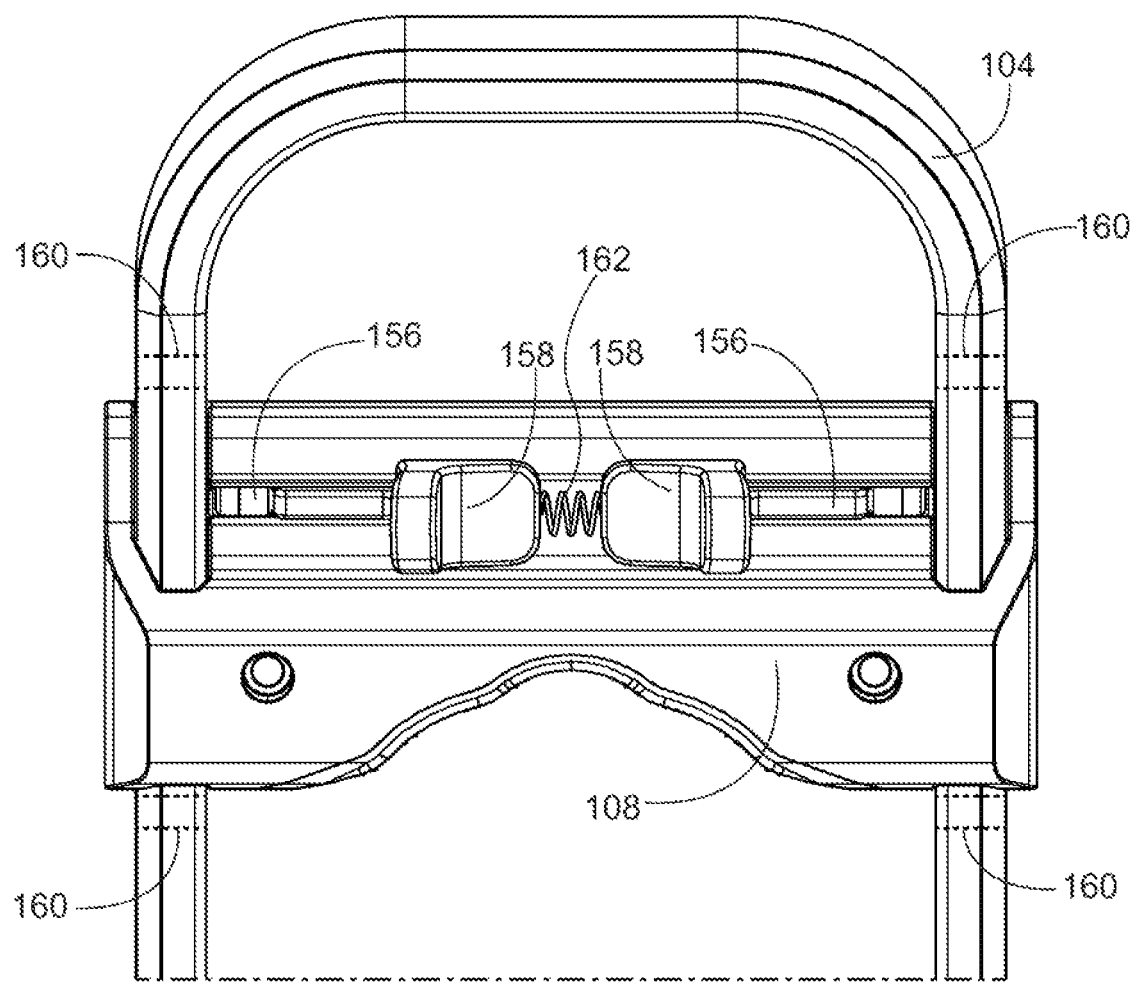
FIG. 12C is a front view of a tire chock used with an embodiment of the actuated arm mechanism.
Figure 12D:
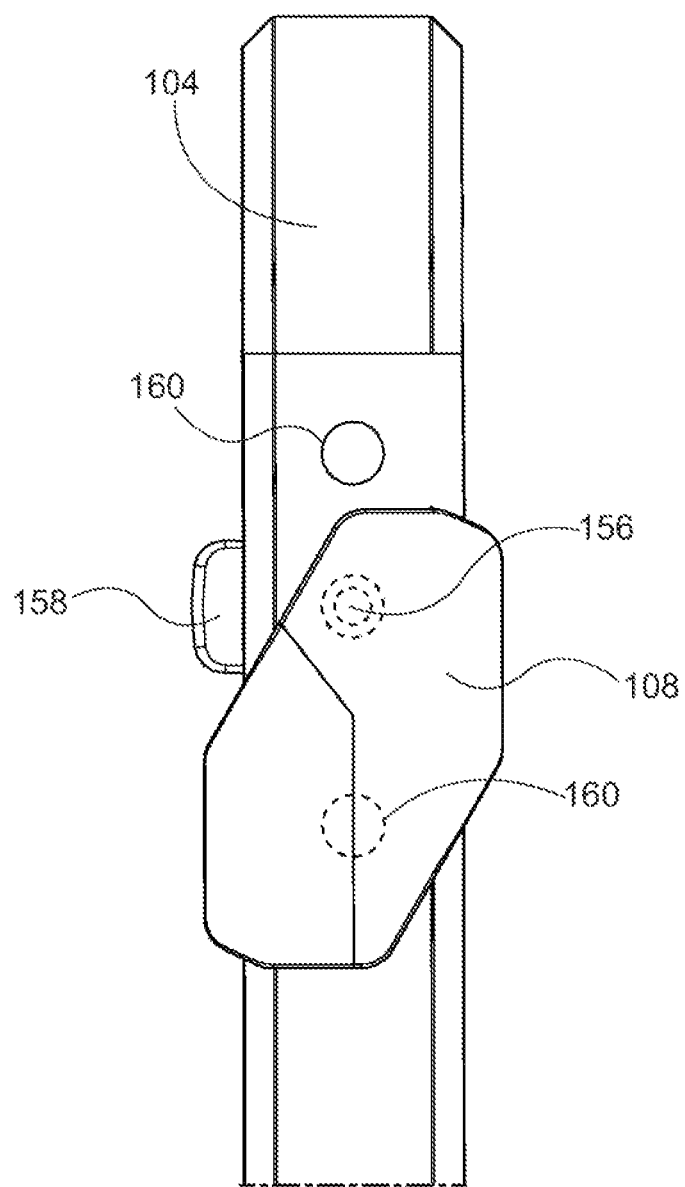
FIG. 12D is a side view of a tire chock used with an embodiment of the actuated arm mechanism.

FIGS. 12A and 12B show front and side views, respectively, of the tire chock on the actuated arm 104. In those figures the retractable pins 156 are extended into apertures 160 on the arm 104 and retain the tire chock 108 in that position with respect to the arm 104. FIGS. 12C and 12D depict front and side views, respectively, of the tire chock when the pins 156 have been retracted by squeezing the actuators 158 together, and then sliding the tire chock partially down the arm 104 toward the next set of apertures 160. This allows a user to adjust the actuated arm 104 to fit different sizes of bicycle tires.

Figure 13A:
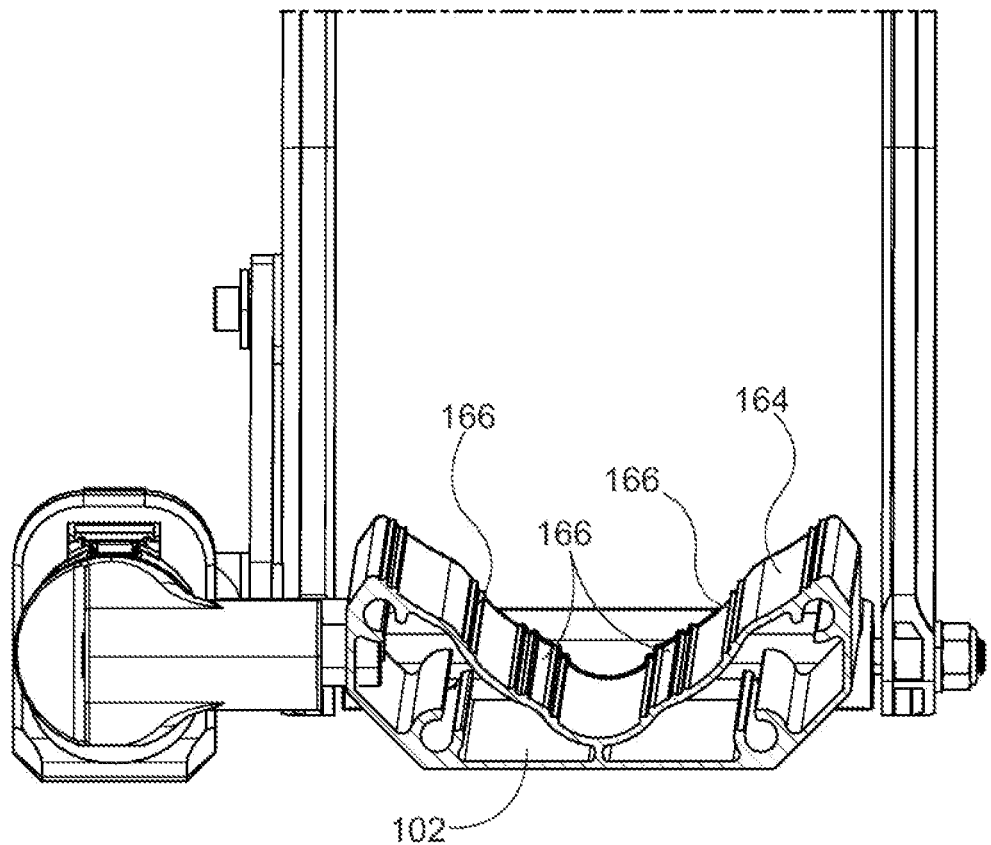
FIG. 13A is a cross-sectional view of a portion of an embodiment of the assembly.
Figure 13B:
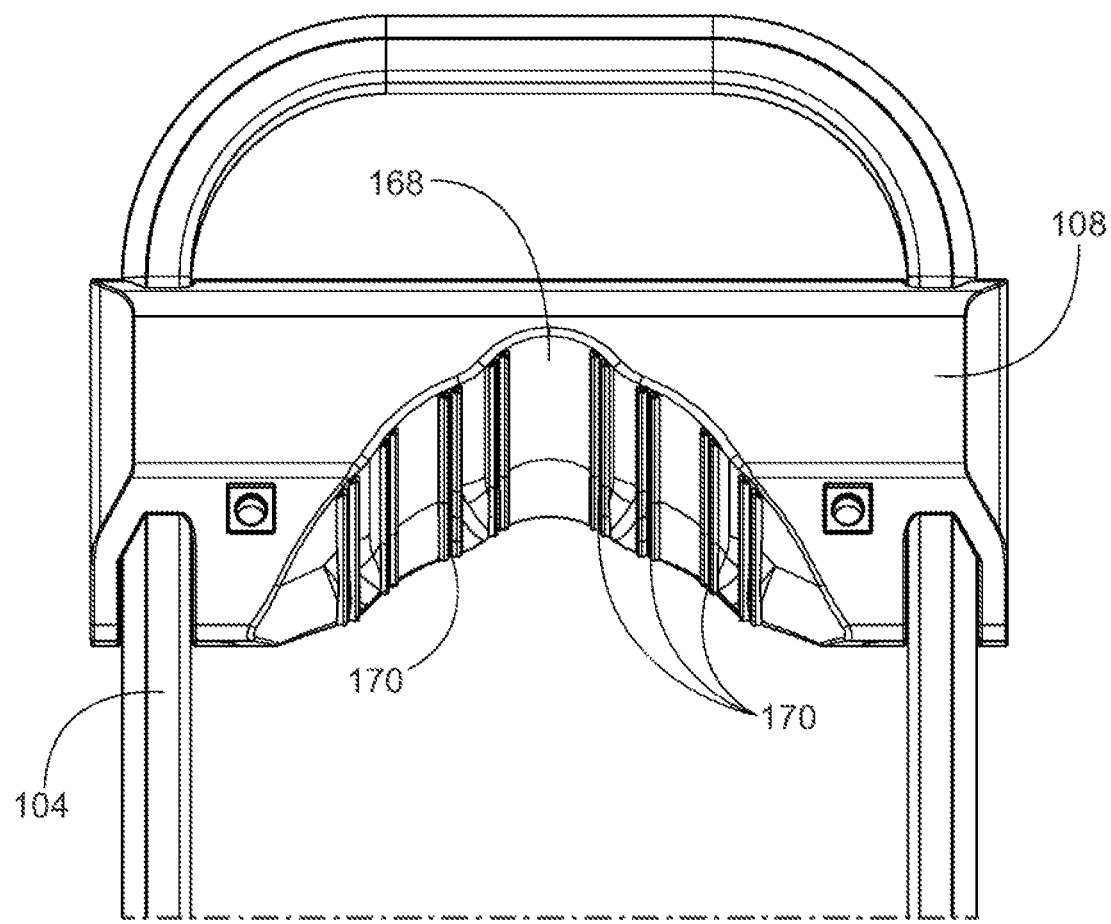
FIG. 13B is a perspective view of a tire chock used with an embodiment of the assembly.

The tire chock 108 and the platform or tray 102 may be provided with contoured surfaces to provide improved grip on the tires of bicycles secured on the rack 100. Referring to FIG. 13A, a cross-sectional view of the tire platform 102 is depicted. The upper surface 164 of the platform 102 has areas of concave and convex curvature, and longitudinal ridges 166 at various locations on the surface 164. In the depicted embodiment, the narrowest concave area in the center of the platform 102 may be designed to have a width between the closest ridges 166 that fits a tire for a road bicycle. The width between the next set of longitudinal ridges 166 may be approximately that of a hybrid tire or a mountain bike tire. In some embodiments the outermost ridges may be spaced apart approximately the width of the tires of a fat tire bike. The placement of concave areas with longitudinal ridges provides improved gripping performance to prevent unwanted movement of the tire on the rack. Other arrangements of ridges 166 may be utilized that are spaced apart more or less than the width of a typical tire.

Similarly, the tire chock 108 may be provided with a tire-contacting surface 168 with ridges 170 that extend in the same general direction as the tire when the bicycle is secured on the rack 100. These ridges 170 may be separated by concave surface areas sized to fit certain bike tires. In some cases, the intervening surface areas may alternate between concave shapes where a tire will contact the tire chock, and either convex, flat, or angled surfaces where the tire will not substantially rest on the platform 102. The surface 168 may be generally angled from front to back of the tire chock 108 so that when the actuated arm is pivoted toward the tire, the surface 168 will be approximately tangential to the bicycle tire.

Integrated Lighting System

In some embodiments of the inventive bicycle rack, the rack may be provided with an integrated lighting system. This lighting system may provide increased visibility and safety during operation of the vehicle to which the rack is attached. In some embodiments the integrated lighting system is attached to, powered, and controlled by the electrical system of the vehicle. In some embodiments it may provide turn signal indicators and brake signal indicators, in addition to passive lighting.

Referring now to FIGS. 14A, 14B, 14C, and 14D an embodiment of a bicycle rack with the integrated lighting system is depicted. In this embodiment, the integrated lighting system is electrically connected to the vehicle's electrical system by any electrical connector typically used to connect a trailer to a vehicle, such as a 4-pole flat connector. Each pin may provide a separate electrical connection for power or control signals. In other embodiments, other types of electrical connectors may be utilized with more or fewer electrical connections, or multiple electrical connectors may be utilized, all within the scope of the present invention. In some embodiments, the integrated lighting system may be provided with an integrated power source such as a battery, solar panel, or other device for electrical power storage or generation. In some embodiments, a wireless connection may be utilized to connect the integrated lighting system to the vehicle for purposes of power delivery or control signal connection.

In various embodiments, the integrated lighting system comprises one or more light emitting elements 172. In the depicted embodiment two light emitting elements 172 are provided on opposing platforms 102, and two are provided on opposing platforms 102 on a rack extension 102 attached to the basic rack. In some embodiments these light emitting elements 172 may be light emitting diodes or other similar devices, although the specific type of light emitting element 172 is not limiting of the scope of the inventive system. In a preferred embodiment of the system the light emitting elements 172 are disposed inside one of the support members 102 of the bicycle rack, although in some embodiments the light emitting elements 172 may be disposed on or in the outer surface of the support members 102. In the depicted embodiment, the light emitting elements 172 are disposed inside the support member 102 and an aperture is provided in the support members 102 to allow light from the light emitting elements 172 to be visible in a desired direction.

In some embodiments, the light emitting elements 172 may comprise devices with attached lenses. In some embodiments, a separate lens or cover may be provided in addition to any integrated lens on the light emitting element 172. The lens may be designed to prevent water, dust, dirt, or other foreign matter from getting into the support member 102. In some embodiments, the lens may be designed to focus, scatter, or spread light from the light emitting elements in a desired manner, such as a Fresnel lens. In some embodiments, the lens may act only as a cover without substantial impact on the light from the light emitting elements 172. The lens may be transparent, translucent, or any desired opacity. Furthermore, the lens may be clear, or any desired color. In a preferred embodiment, the lens is highly translucent for red light, i.e. it is a red lens.

In some embodiments, the light emitting elements are electrically connected to the electrical connector by a wiring harness comprising one or more electrical conductors 200. In some cases, the power to the light emitting element 172 may be of varying voltages to generate varying levels of brightness. In other cases, the power to the light emitting element 172 may be intermittent to cause the light emitting element to flash or blink. In other embodiments and as electrical and light emitting devices are further developed, the light emitting devices may be controlled by digital signals transmitted with the power source or separately. Similarly, other embodiments of the invention may include light emitting devices that are not connected via a wiring harness but are wirelessly connected to a control component in the rack or directly to a vehicle. Similarly, such devices may have integrated power storage or generation, and may be digitally controlled by the vehicle or a control component on the rack.

Referring now to FIG. 14C, a cross-sectional view of an embodiment of the rack 100 with an integrated lighting system is depicted. In this embodiment of the rack 100, the platforms 102 are removably attached to the frame member 103. The electrical wiring 174 in the platform 102 is connected to spring-loaded terminals 178, while electrical wiring 200 in the support member 103 is connected to spring-loaded terminals 176, allowing the platform 102 to be installed on and removed from the member 103 without damaging the wiring or requiring any additional steps of connecting wires. FIG. 14D depicts the location of the terminals 176 on the platform 102 when it is disconnected from the support member 103. As can be seen in FIG. 14D, a single bolt may be utilized to hold the tire tray 102 onto the sport member 103.

Similarly, the rack extension 102 is removably attached to the base rack assembly 100. In a preferred embodiment, a electrical connection to the rack extension is made using a similar quick connect device to that shown in FIG. 14C, with one terminal disposed on the distal end of the support member 103 and the other attached to the proximal end of the extension support member for the rack extension. The electrical terminals may be disposed on internal members of each of the support members, facing each other at the connection between the members, similarly to the disposition of the terminals on the tire platforms connected to the support member 103.

The rack extension may be repeatedly installed and removed from the base rack assembly 100, so the use of electrical connections that automatically connect is an important component of the system. Although manual connections may be utilized on some embodiments, preferred embodiments of the system will utilize electrical connectors that automatically connect as the rack extension is attached to the base rack assembly. For example, these connections include "pogo pins" or other types of spring-loaded electrical connectors, or even flat or metal-on-metal connectors may be used in some embodiments.

Figure 14B:
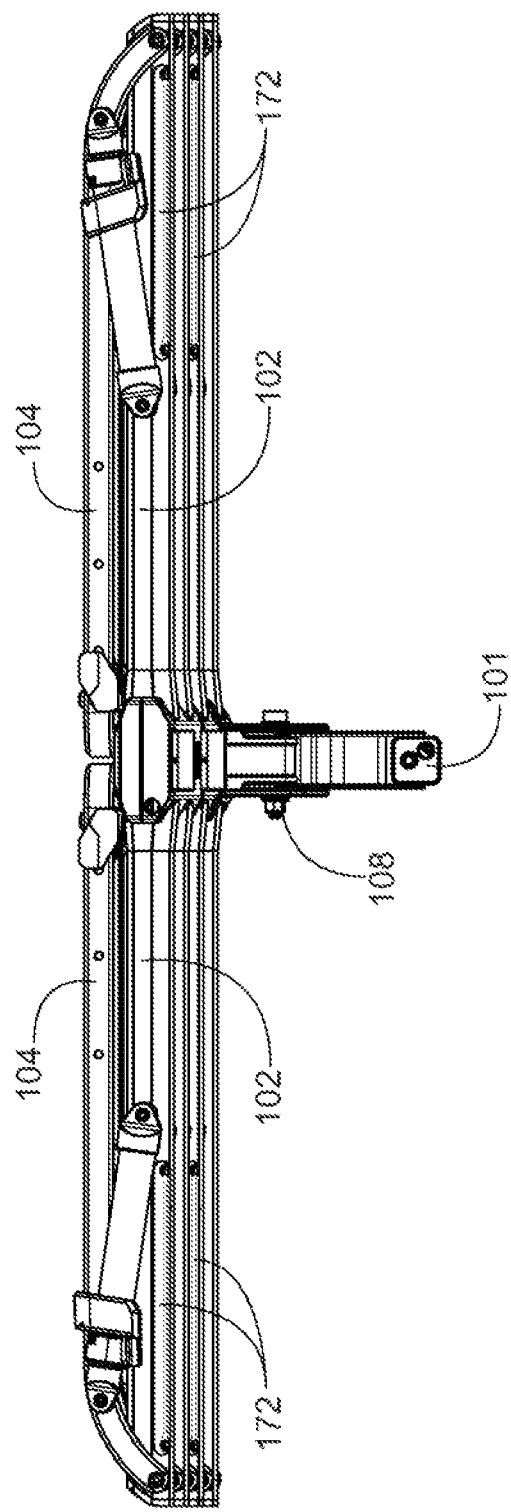
FIG. 14B is an end view of an embodiment of the assembly with an integrated lighting system in a deployed configuration.
Figure 14D:
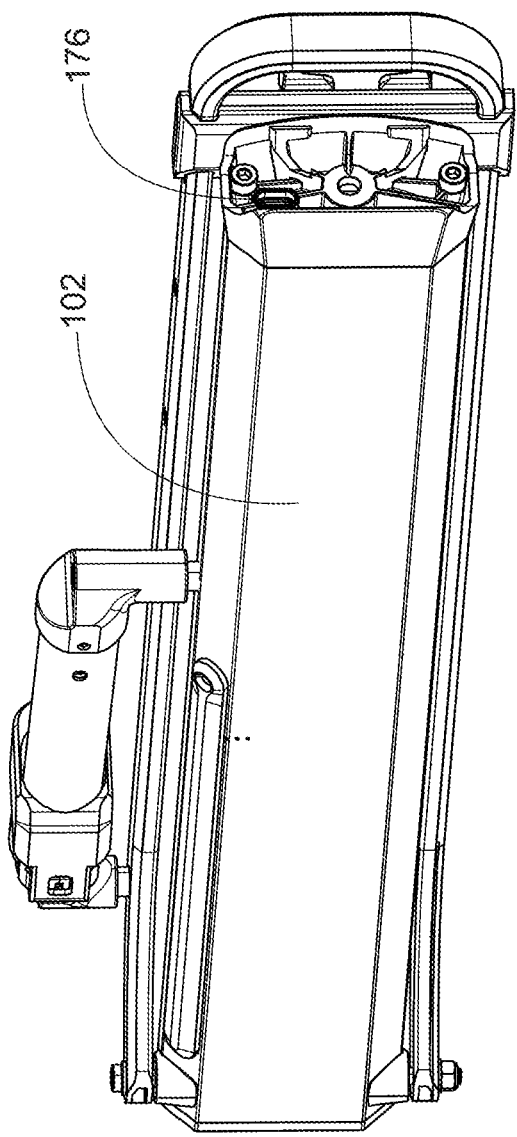
FIG. 14D is a perspective view of an embodiment of the assembly with an integrated lighting system.

In some of the embodiments of the bicycle rack with the integrated lighting system, the rack may be provided with support members that rotate or pivot from an operational configuration (such as shown in FIG. 14B) to a non-operational configuration (such as shown in FIG. 14A). In the operational configuration, the rack may be used to support one or more bicycles. In the non-operational configuration, the rack is not disposed to support a bicycle but may be a folded or raised configuration so that it extends a shorter distance behind a vehicle than in the operational configuration. The non-operational configuration may be more convenient, safer, or require less space than the operational configuration. In some embodiments of the rack with the integrated lighting system, the system is designed so that light from the light emitting elements 172 is visible from behind the vehicle when the rack is in both operational and non-operational configurations. For example, this would allow the integrated lighting system to function as vehicle turn signal indicators when the rack is in use in the operational configuration to carry a bicycle and when it has been pivoted upward to the non-operational storage configuration.

In some embodiments the light visibility in both configurations requires a portion of the light from each light emitting element 172 to be transmitted in multiple directions, or at least substantially in two directions, so that the light is visible in both configurations. The visibility in both configurations may be provided by a lens designed to reflect a portion of the light in two different directions, or a lens with two different areas designed to reflect light differently, or multiple lenses to reflect a portion of the light from a single light emitting element 172 in multiple directions.

In the depicted embodiment, the light emitting element 172 is disposed on a chamfered edge of the platform 102 between the two desired directions of light transmission. Therefore, some light from the lights will be visible in either operational or non-operational configuration. In the depicted example, the general direction of light transmission in the operational configuration is substantially perpendicular to the direction of light transmission in the non-operational configuration. In the depicted embodiment the light emitting element 172 is disposed in a direction that is substantially half way or 45° between the two general directions of light transmission. A chamfer surface is provided in the support member 102 to allow light from the light emitting source 172 to be transmitted through the aperture over a range of directions that encompasses both desired directions of transmission.

"Substantially" or "about" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An equipment rack for a bicycle, comprising:
a platform for receiving a tire of a bicycle;
an arm pivotally attached to the platform for securing a tire of a bicycle on the platform;
an actuator connected to the platform and the arm;
a latch mechanism;
wherein when the latch mechanism is disengaged the actuator pivots the arm to an open position.

2. The equipment rack of claim 1 wherein when the arm pivots to the open position the latch mechanism automatically re-engages.

3. The equipment rack of claim 1 wherein the latch mechanism allows the arm to pivot toward a closed position and prevents the arm from pivoting in the other direction until the latch mechanism is released.

4. The equipment rack of claim 1 wherein the open position comprises an angle between the arm and the platform of between 90° and 180°.

5. The equipment rack of claim 4 wherein the arm is configured to pivot to a position wherein the angle between the arm and the platform is greater than 180°.

6. The equipment rack of claim 1 further comprising a linkage, a first end of the linkage is pivotally attached to the arm, and a second end of the linkage is pivotally attached to the actuator, and wherein the actuator is fixedly attached to the platform.

7. The equipment rack of claim 6, the actuator further comprising a housing and a cylinder housing extendably disposed in the housing, wherein the housing is fixedly attached to the platform, and one end of the cylinder housing is pivotally attached to the second end of the linkage.

8. An equipment rack for carrying a bicycle, comprising:
a platform for receiving a tire of a bicycle;
an arm pivotally attached to the platform for securing a tire of a bicycle on the platform;
an actuator connected to the platform and to the arm, wherein when the actuator is activated it pivots the arm to an open position.

9. The equipment rack of claim 8 wherein the actuator automatically deactivates when the arm pivots to an open position.

10. The equipment rack of claim 8 wherein the actuator allows the arm to pivot toward a closed position but prevents the arm from pivoting to an open position until activation of the actuator.

11. The equipment rack of claim 8 further comprising a latch mechanism, wherein activating the actuator comprises disengaging the latch mechanism.

12. The equipment rack of claim 8 wherein the actuator remains activated until the arm pivots to a desired position.

13. An equipment rack for carrying a bicycle comprising:
a tire support member for receiving a tire of a bicycle,
a tire-securing member movably connected to the tire support member;
a powered actuating assembly configured to impel the tire-securing arm from a closed position to a loading position upon activation.

14. The equipment rack of claim 13 wherein the powered actuating assembly is configured to constrain the tire-securing arm to the closed position until activation.

15. The equipment rack of claim 13 further comprising a mechanism capable of activating the powered actuating assembly.

16. The equipment rack of claim 15 wherein the activation mechanism activates the powered actuating assembly until the tire-securing member reaches the open position.

17. The equipment rack of claim 15 wherein the activation mechanism is operated by disengaging a latch or pawl.

18. The equipment rack of claim 15 wherein the activation mechanism deactivates the powered actuating assembly when the tire-securing arm reaches the open position.

19. The equipment rack of claim 13 wherein in the closed position the tire-securing member is disposed against the tire of a bicycle.

20. The equipment rack of claim 13 wherein in the closed position the tire-securing member is disposed against the tire support member.

* * * * *